(12) United States Patent
Seki et al.

(10) Patent No.: US 10,359,114 B2
(45) Date of Patent: Jul. 23, 2019

(54) SEALING DEVICE

(71) Applicant: NOK CORPORATION, Tokyo (JP)

(72) Inventors: Kazunari Seki, Kitaibaraki (JP); Koji Watanabe, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/680,190

(22) Filed: Aug. 17, 2017

(65) Prior Publication Data
US 2017/0343110 A1 Nov. 30, 2017

Related U.S. Application Data

(62) Division of application No. 14/764,858, filed as application No. PCT/JP2014/053938 on Feb. 19, 2014, now abandoned.

(30) Foreign Application Priority Data

| Feb. 20, 2013 | (JP) | 2013-031085 |
| Apr. 18, 2013 | (JP) | 2013-087087 |
| Aug. 23, 2013 | (JP) | 2013-173512 |

(51) Int. Cl.
*F16J 15/24* (2006.01)
*F16J 15/44* (2006.01)
*F16J 15/16* (2006.01)

(52) U.S. Cl.
CPC ............. *F16J 15/24* (2013.01); *F16J 15/164* (2013.01); *F16J 15/441* (2013.01)

(58) Field of Classification Search
CPC ...... F16J 15/34; F16J 15/3412; F16J 15/3408; F16J 15/3452; F16J 15/24
(Continued)

(56) References Cited

U.S. PATENT DOCUMENTS 1,369,592 A * 2/1921 White ............ F16J 9/206
277/434
1,499,571 A * 7/1924 Davis ............ F16J 9/20
277/434
(Continued)

FOREIGN PATENT DOCUMENTS

DE 1934396 U 3/1966
EP 1420145 A2 5/2004
(Continued)

OTHER PUBLICATIONS

Extended European search report dated Sep. 26, 2016.

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A sealing device includes a seal ring 200 made of resin which is in close contact with a side wall surface on a low pressure side of an annular groove 410, and slides against an inner peripheral surface of a shaft hole in a housing 500 through which a shaft 400 is inserted. A metal spring 300 presses the seal ring 200 toward an outer peripheral surface side, wherein a concave portion 220 is formed on an outer peripheral surface of the seal ring 200 which extends from an end portion on a high pressure side of the outer peripheral surface to a position which does not reach an end portion on a low pressure side of the outer peripheral surface, and introduces a fluid from the high pressure side.

6 Claims, 15 Drawing Sheets

(58) Field of Classification Search
USPC ....... 277/581, 580, 589, 579, 578, 545, 463, 277/469
See application file for complete search history.

(56) References Cited

U.S. PATENT DOCUMENTS

| | | | | |
|---|---|---|---|---|
| 1,956,366 A * | 4/1934 | Vedovell | ............... | F16J 15/54 277/363 |
| 2,639,205 A * | 5/1953 | Engelhardt | ............ | F16J 9/063 277/463 |
| 3,223,426 A * | 12/1965 | Reid | ............... | F16J 15/121 277/467 |
| 3,762,727 A * | 10/1973 | Jackowski | ......... | F16J 15/3456 277/374 |
| 3,847,389 A * | 11/1974 | Rogers | ............... | F16J 15/3208 277/553 |
| 4,278,218 A * | 7/1981 | Uhrner | ............... | A47L 15/42 277/373 |
| 4,429,854 A * | 2/1984 | Kar | ............... | E21B 10/25 175/371 |
| 5,799,953 A * | 9/1998 | Henderson | ......... | F16J 15/3236 277/554 |
| 5,957,098 A * | 9/1999 | Fukuhara | ............ | F01L 1/3442 123/90.17 |
| 5,979,904 A * | 11/1999 | Balsells | ............... | F16J 15/3236 277/554 |
| 6,516,762 B1 * | 2/2003 | Kinugawa | ............ | F01L 1/3442 123/90.17 |
| 6,905,144 B2 * | 6/2005 | Vila | ............... | F16J 15/3212 277/589 |
| 7,195,469 B2 * | 3/2007 | Tsuchiya | ............ | F04C 27/005 277/589 |
| 7,959,159 B2 * | 6/2011 | Hocker | ............... | F02M 59/442 277/559 |
| 2005/0184468 A1 * | 8/2005 | Aoshiba | ............... | F16J 15/3208 277/549 |
| 2005/0212218 A1 * | 9/2005 | Balsells | ............... | F16J 1/008 277/434 |
| 2006/0022414 A1 * | 2/2006 | Balsells | ............... | F16J 15/3268 277/572 |
| 2006/0169134 A1 | 8/2006 | Dunaevsky et al. | | |
| 2008/0106046 A1 * | 5/2008 | Datta | ............... | F16J 15/0887 277/644 |
| 2009/0045587 A1 * | 2/2009 | DeAngelis | ........... | F01L 1/3442 277/500 |
| 2010/0001475 A1 * | 1/2010 | Janian | ............... | F16J 15/3212 277/460 |
| 2010/0066032 A1 * | 3/2010 | Girman | ............... | F16J 15/322 277/522 |
| 2010/0084820 A1 | 4/2010 | Maeda et al. | | |
| 2011/0133415 A1 * | 6/2011 | Vu | ............... | F16J 15/061 277/608 |
| 2012/0018957 A1 * | 1/2012 | Watanabe | ............ | F16J 15/441 277/387 |
| 2012/0024149 A1 * | 2/2012 | Brondolin | ........... | B22D 17/203 92/208 |
| 2012/0235361 A1 * | 9/2012 | Tadano | ............... | F16J 15/164 277/554 |
| 2013/0323103 A1 * | 12/2013 | Shreve | ............... | F04B 1/0448 417/437 |
| 2014/0070497 A1 * | 3/2014 | Werdecker | .......... | F16J 15/3452 277/500 |
| 2015/0061227 A1 * | 3/2015 | Rastegar | ............ | F16J 15/3212 277/309 |
| 2015/0369367 A1 * | 12/2015 | Kuroki | ............... | F16J 15/442 277/543 |

FOREIGN PATENT DOCUMENTS

| | | |
|---|---|---|
| FR | 523242 A | 8/1921 |
| JP | S60-069350 | 5/1985 |
| JP | S60-149567 | 10/1985 |
| JP | H09133215 A | 5/1997 |
| JP | H09217836 A | 8/1997 |
| JP | 2010-265937 A | 11/2010 |
| JP | 4665046 B1 | 4/2011 |
| JP | 2011-144847 A | 7/2011 |

* cited by examiner

SEALING DEVICE

CROSS-REFERENCE TO RELATED APPLICATIONS

This application is a Divisional of U.S. application Ser. No. 14/764,858, filed Jul. 30, 2015 (now abandoned), which is a National Stage of International Application No. PCT/JP2014/053938, filed Feb. 19, 2014 (now WO 2014/129505A1, published Aug. 28, 2014), which claims priority to Japanese Application No. 2013-031085, filed Feb. 20, 2013; Japanese Application No. 2013-087087, filed Apr. 18, 2013; and Japanese Application No. 2013-173512, filed Aug. 23, 2013. The entire disclosures of the above applications are incorporated herein by reference.

FIELD

The present disclosure relates to a sealing device which seals an annular gap between a shaft and a shaft hole of a housing.

BACKGROUND

In an automatic transmission (AT) and a continuously variable transmission (CVT) for automobiles, in order to hold a hydraulic pressure, a seal ring which seals an annular gap between a shaft and a housing which rotate relative to each other is provided. With reference to FIGS. 33 and 34, a seal ring according to a conventional art will be described. FIG. 33 is a schematic cross-sectional view showing a seal ring according to the conventional art in a condition in which the hydraulic pressure is not held. FIG. 34 is a schematic cross-sectional view showing the seal ring according to the conventional art in a condition in which the hydraulic pressure is held. In the case of a seal ring 600 according to the conventional art, the seal ring 600 is configured so as to seal an annular gap between a shaft 400 and a shaft hole of a housing 500 by being attached to an annular groove 410 provided on an outer periphery of the shaft 400, and being slidably in contact with an inner peripheral surface of the shaft hole of the housing 500, through which the shaft 400 is inserted, and a side wall surface of the annular groove 410.

In the seal ring 600 which is used for the above described purpose, it is required to sufficiently reduce a sliding torque. Accordingly, the circumference of an outer peripheral surface of the seal ring 600 is configured to be shorter than the circumference of the inner peripheral surface of the shaft hole of the housing 500, thus it is configured to have no interference. Consequently, in a condition in which an engine of an automobile is operated and the hydraulic pressure is high, the seal ring 600 is expanded in diameter by the hydraulic pressure and makes close contact with the inner peripheral surface of the shaft hole and the side wall surface of the annular groove 410 to thereby exhibit a function of sufficiently holding the hydraulic pressure (see FIG. 34). In contrast to this, in a condition in which the hydraulic pressure is not applied due to stoppage of the engine, the seal ring 600 is configured so as to be apart from the inner peripheral surface of the shaft hole and the side wall surface of the annular groove 410 (see FIG. 33).

However, in the case of the seal ring 600 which is configured in the above described manner, the seal ring 600 does not exhibit a sealing function in the condition in which the hydraulic pressure is not applied. Accordingly, in a configuration such as AT or CVT, in which gear shifting control is performed by oil which is pressure-fed by a hydraulic pump, when it is in a no-load condition in which the hydraulic pump is stopped (e.g., during an idling stop), the oil sealed by the seal ring 600 may no longer be sealed and return to an oil pan, thereby leaving no oil in the vicinity of the seal ring 600. Consequently, when the engine is started (re-started) from such a condition, the operation is started in a condition in which no oil is present in the vicinity of the seal ring 600; hence, without lubrication, a problem arises in that responsiveness or operativity may be poor.

CITATION LIST

Patent Literature

Patent Literature 1: Japanese Patent No. 4665046
Patent Literature 2: Japanese Patent Application Laid-open No. 2011-144847
Patent Literature 3: Japanese Patent Application Laid-open No. 2010-265937

SUMMARY

Technical Problem

An object of the present disclosure is to provide a sealing device that is capable of exhibiting a sealing function even in a condition in which a fluid pressure is low while suppressing its sliding torque.

Solution to Problem

In order to solve the above problem, the present disclosure has adopted the following means.

That is, the sealing device according to the present disclosure is a sealing device which is attached to an annular groove provided on an outer periphery of a shaft and holds a fluid pressure in a sealing target area by sealing an annular gap between the shaft and a housing rotating relative to each other, the sealing target area being configured such that the fluid pressure changes, the sealing device including: a seal ring made of resin which is in close contact with a side wall surface on a low pressure side of the annular groove, and slides against an inner peripheral surface of a shaft hole in the housing through which the shaft is inserted; and a metal spring which is provided along an inner peripheral surface of the seal ring in a state in which a gap is formed between the metal spring and a groove bottom surface of the annular groove, and presses the seal ring toward an outer peripheral surface side, wherein a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side.

Note that, in the present disclosure, the "high pressure side" denotes one side where a pressure is high when a pressure difference is created between two sides of the sealing device, and the "low pressure side" denotes another side where the pressure is low when the pressure difference is created between the two sides of the sealing device.

According to the sealing device of the present disclosure, the seal ring is pressed towards the outer peripheral surface side by the metal spring. Accordingly, even in a condition in which the fluid pressure is not applied (the pressure difference is not created) or the fluid pressure is almost not applied (the pressure difference is almost not created), the seal ring is contact with the inner peripheral surface of the shaft hole of the housing, thereby exhibiting a sealing function. Consequently, it is possible to hold the fluid pressure from immediately after the start of increase of the fluid pressure in the sealing target area. In addition, the concave portion is formed on the outer peripheral surface of the seal ring, and the fluid is introduced into the concave portion from the high pressure side. Accordingly, even when the fluid pressure is increased, the fluid pressure acts towards the inner peripheral surface side within an area where the concave portion is provided. Consequently, it is possible to prevent the increase of pressure acting towards the outer peripheral surface side via the seal ring due to the increase of the fluid pressure, thereby making it possible to suppress a sliding torque.

Since the metal spring is provided so as to be placed along the inner peripheral surface of the seal ring in the state in which the gap is formed between the metal spring and the groove bottom surface of the annular groove, the metal spring is hardly influenced by eccentricity of the shaft and the housing. In addition, the seal ring and the metal spring would not rotate relative to each other. Consequently, the seal ring and the metal spring would not slide relative to each other; hence the inner peripheral surface side of the seal ring would not be abraded due to sliding.

In addition, a plurality of the concave portions may preferably be formed at intervals in a circumferential direction.

When such a configuration is adopted, a portion between the two concave portions maintains a state in which it is in contact with the inner peripheral surface of the shaft hole of the housing, and it becomes possible to suppress degrading of the rigidity of the seal ring. Consequently, it becomes possible to prevent the seal ring from being tilted within the annular groove, and stabilize an attachment state of the seal ring.

Further, a guide portion which positions the metal spring in an axial direction (a direction of a central axis of the shaft; the same shall apply hereinafter) may preferably be formed on the inner peripheral surface of the seal ring.

Accordingly, it becomes possible to prevent the metal spring from being displaced in the axial direction. Consequently, the seal ring can be pressed towards the outer peripheral surface side stably by the metal spring.

In addition, another sealing device of the present disclosure is a sealing device which is attached to an annular groove provided on an outer periphery of a shaft and holds a fluid pressure in a sealing target area by sealing an annular gap between the shaft and a housing rotating relative to each other, the sealing target area being configured such that the fluid pressure changes, the sealing device including: a seal ring made of resin which is in close contact with a side wall surface on a low pressure side of the annular groove, and slides against an inner peripheral surface of a shaft hole in the housing through which the shaft is inserted; and a metal spring which is provided along an inner peripheral surface of the seal ring in a state in which a gap is formed between the metal spring and a groove bottom surface of the annular groove, and presses the seal ring toward an outer peripheral surface side, wherein a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side, and a guide portion which positions the metal spring in an axial direction is formed on the inner peripheral surface of the seal ring, and a protrusion which prevents the metal spring from being detached to an inner peripheral surface side is provided at a tip of the guide portion.

Still further, yet another sealing device of the present disclosure is a sealing device which is attached to an annular groove provided on an outer periphery of a shaft and holds a fluid pressure in a sealing target area by sealing an annular gap between the shaft and a housing rotating relative to each other, the sealing target area being configured such that the fluid pressure changes, the sealing device including: a seal ring made of resin which is in close contact with a side wall surface on a low pressure side of the annular groove, and slides against an inner peripheral surface of a shaft hole in the housing through which the shaft is inserted; and a metal spring which is provided along an inner peripheral surface of the seal ring in a state in which a gap is formed between the metal spring and a groove bottom surface of the annular groove, and presses the seal ring toward an outer peripheral surface side, wherein a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side, and an abutment portion is provided at one position on the seal ring in a circumferential direction, and protrusions which restrict a movement of the metal spring in the circumferential direction are provided on the inner peripheral surface on both sides of the abutment portion.

Still further, yet another sealing device of the present disclosure is a sealing device which is attached to an annular groove provided on an outer periphery of a shaft and holds a fluid pressure in a sealing target area by sealing an annular gap between the shaft and a housing rotating relative to each other, the sealing target area being configured such that the fluid pressure changes, the sealing device including: a seal ring made of resin which is in close contact with a side wall surface on a low pressure side of the annular groove, and slides against an inner peripheral surface of a shaft hole in the housing through which the shaft is inserted; and a metal spring which is provided along an inner peripheral surface of the seal ring in a state in which a gap is formed between the metal spring and a groove bottom surface of the annular groove, and presses the seal ring toward an outer peripheral surface side, wherein a concave portion is formed on the inner peripheral surface of the seal ring which extends from an end portion on a high pressure side of the outer peripheral surface to a position which does not reach an end portion on a low pressure side of the outer peripheral surface, and introduces a fluid from the high pressure side, a guide portion which positions the metal spring in an axial direction, and a first protrusion which prevents the metal spring from being detached to an inner peripheral surface side is provided at a tip of the guide portion, and an abutment portion is provided at one position on the seal ring in a circumferential direction, and second protrusions which restrict a movement of the metal spring in the circumferential direction are provided on the inner peripheral surface on both sides of the abutment portion.

In addition, in each of the aspects of the disclosure described above, a convex portion which extends in the circumferential direction may preferably be provided at a center in a width direction on the outer peripheral surface of the seal ring, and a portion closer to the high pressure side than the convex portion may be the concave portion.

Note that, in each of these aspects of the present disclosure, the "high pressure side" denotes one side where a pressure is high when a pressure difference is created between two sides of the sealing device, and the "low pressure side" denotes another side where the pressure is low when the pressure difference is created between the two sides of the sealing device.

Also in each of these sealing devices, the seal ring is pressed towards the outer peripheral surface side by the metal spring. Accordingly, even in a condition in which the fluid pressure is not applied (the pressure difference is not created) or the fluid pressure is almost not applied (the pressure difference is almost not created), the seal ring is contact with the inner peripheral surface of the shaft hole of the housing, thereby exhibiting a sealing function. Consequently, it is possible to hold the fluid pressure from immediately after the start of increase of the fluid pressure in the sealing target area. In addition, the concave portion is formed on the outer peripheral surface of the seal ring, and the fluid is introduced into the concave portion from the high pressure side. Accordingly, even when the fluid pressure is increased, the fluid pressure acts towards the inner peripheral surface side within an area where the concave portion is provided. Consequently, it is possible to prevent the increase of pressure acting towards the outer peripheral surface side via the seal ring due to the increase of the fluid pressure, thereby making it possible to suppress a sliding torque.

Since the metal spring is provided so as to be placed along the inner peripheral surface of the seal ring in the state in which the gap is formed between the metal spring and the groove bottom surface of the annular groove, the metal spring is hardly influenced by eccentricity of the shaft and the housing. In addition, the seal ring and the metal spring would not rotate relative to each other. Consequently, the seal ring and the metal spring would not slide relative to each other; hence the inner peripheral surface side of the seal ring would not be abraded due to sliding.

In the case where the configuration is adopted in which a guide portion which positions the metal spring in the axial direction is formed on the inner peripheral surface of the seal ring, it becomes possible to prevent the metal spring from being displaced in the axial direction. Consequently, the seal ring can be pressed towards the outer peripheral surface side stably by the metal spring.

In addition, by providing the protrusion (the first protrusion) which prevents the metal spring from being detached to the inner peripheral surface side at the tip of the guide portion, it becomes possible to prevent the metal spring from being detached from the seal ring, when the seal ring is attached to the annular groove or the like.

In addition, in the case where the configuration is adopted in which the abutment portion is provided at one position of the seal ring in the circumferential direction, and the protrusions (the second protrusions) which restrict the movement of the metal spring in the circumferential direction are provided on the inner peripheral surface on both sides of the abutment portion, it is possible to prevent positional displacement of the metal spring relative to the seal ring in the circumferential direction. Accordingly, it becomes possible to exercise a stable sealing performance.

Advantageous Effects of Invention

As described thus far, according to the present invention, it is possible to exercise the sealing function even in a condition in which the fluid pressure is low while suppressing the sliding torque.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described. Note that a sealing device according to each of the present examples is used for the purpose of sealing an annular gap between a shaft and a housing which rotate relative to each other in order to hold a hydraulic pressure in a transmission for automobiles such as AT and CVT. In addition, in the following description, a "high pressure side" denotes one side where a pressure is high when a pressure difference is created between two sides of the sealing device, and a "low pressure side" denotes another side where the pressure is low when the pressure difference is created between the two sides of the sealing device.

FIRST EXAMPLE

Figure 1:
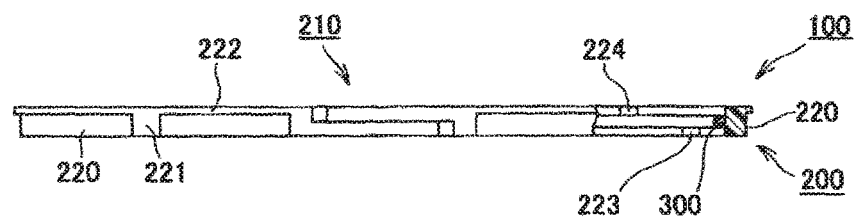
FIG. 1 is a partially cutaway cross-sectional view of a sealing device according to a first example of the present disclosure.
Figure 2:
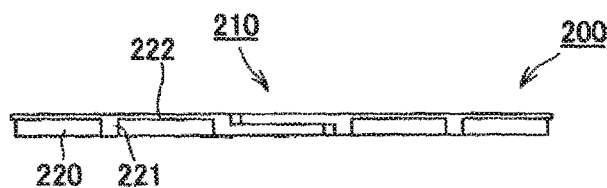
FIG. 2 is a view showing an outer peripheral ring according to the first example of the present disclosure when viewed from an outer peripheral surface side.
Figure 3:
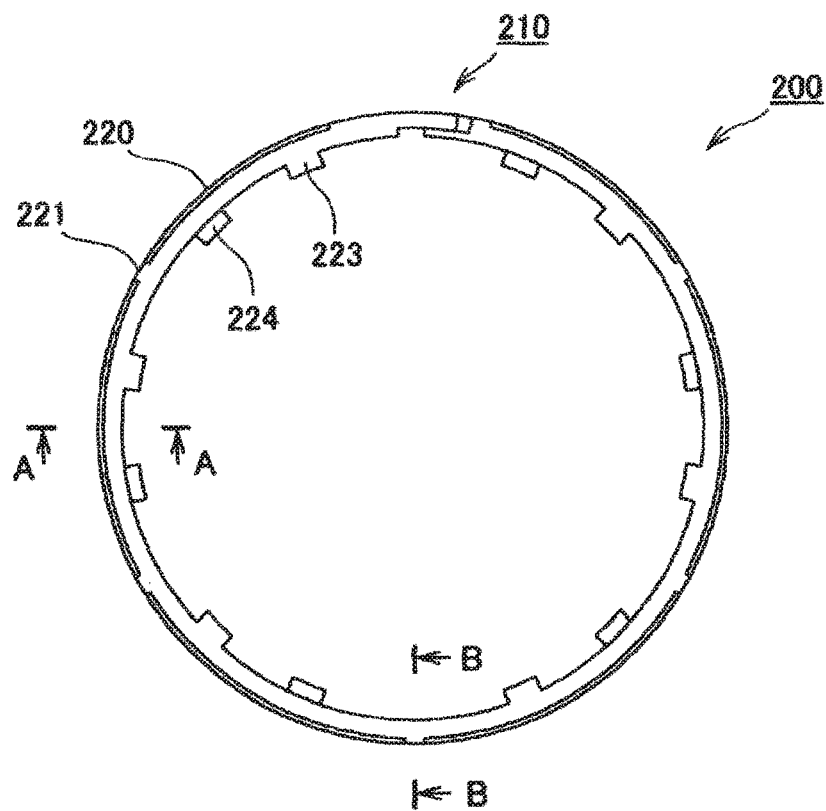
FIG. 3 is a side view of the outer peripheral ring according to the first example of the present disclosure.
Figure 4:
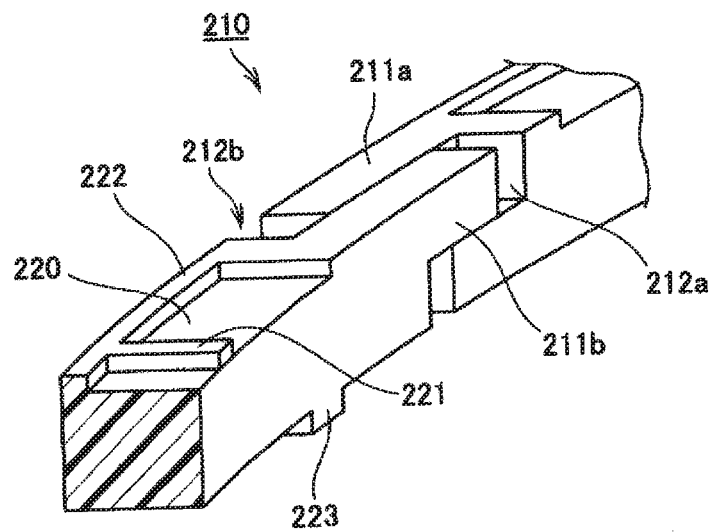
FIG. 4 is a partially cutaway perspective view of the outer peripheral ring according to the first example of the present disclosure.
Figure 5:
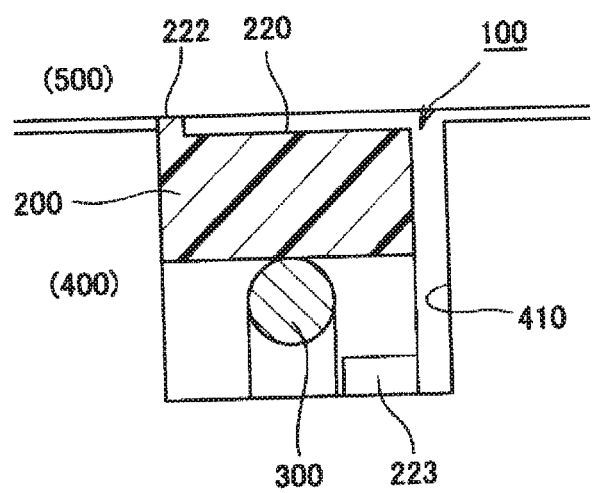
FIG. 5 is a schematic cross-sectional view showing a sealing device according to the first example of the present disclosure in a no-load condition.
Figure 6:
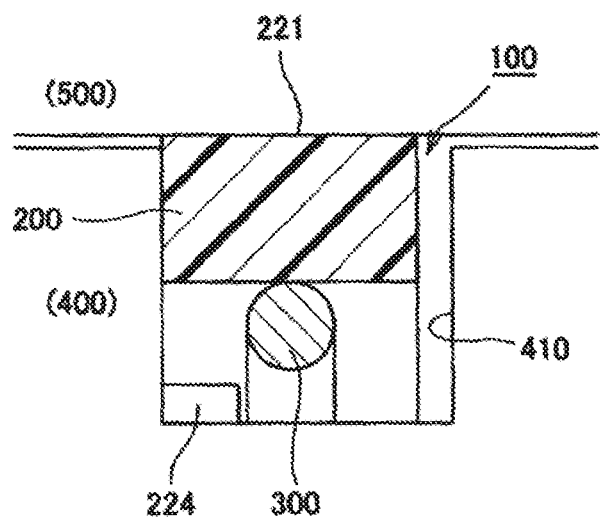
FIG. 6 is a schematic cross-sectional view showing the sealing device according to the first example of the present disclosure in the no-load condition.
Figure 7:
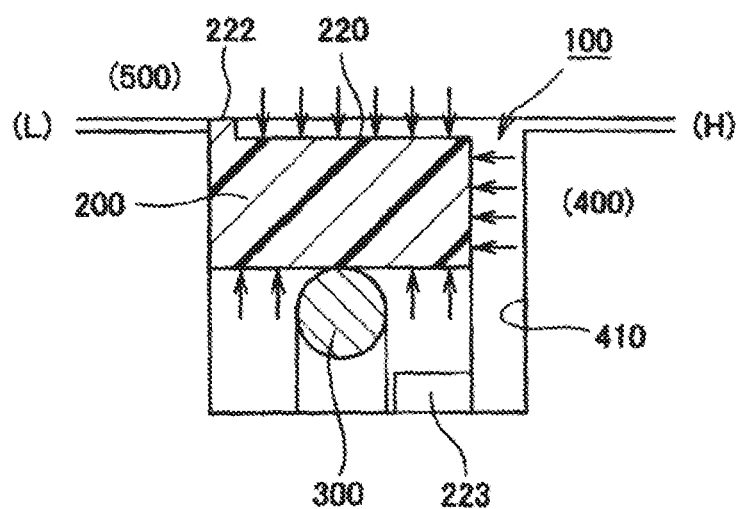
FIG. 7 is a schematic cross-sectional view showing the sealing device according to the first example of the present disclosure in a high-pressure condition.

With reference to FIGS. 1 to 7, a sealing device according to a first example of the present disclosure will be described.
<Configuration of Sealing Device>
With reference to FIGS. 1 and 5 to 7, in particular, the configuration of the sealing device according to the first example of the present disclosure will be described. A sealing device 100 according to the present example is attached to an annular groove 410 provided on an outer periphery of a shaft 400, and seals an annular gap between the shaft 400 and a housing 500 (an inner peripheral surface of a shaft hole in the housing 500 through which the shaft 400 is inserted) which rotate relative to each other. With this, the sealing device 100 holds a fluid pressure in a sealing target area configured such that the fluid pressure (a hydraulic pressure in the present example) changes. Herein, in the present example, the fluid pressure in the right area in each of FIGS. 5 to 7 is configured to change, and the sealing device 100 plays a role in holding the fluid pressure in the sealing target area on the right in the drawing. Note that, in a condition in which an engine of an automobile is stopped, the fluid pressure in the sealing target area is low and a no-load condition is created, and when the engine is started, the fluid pressure in the sealing target area increases.

The sealing device 100 according to the present example is constituted of a seal ring 200 that is made of resin such as polyetheretherketone (PEEK), polyphenylene sulfide (PPS), or polytetrafluoroethylene (PTFE), and a metal spring 300. For the metal spring 300 in the present example, a C-ring, in which a cut-out is made at one place on an annular member in a circumferential direction, is used.

In a state in which the seal ring 200 is combined with the metal spring 300, the circumference of an outer peripheral surface of the seal ring 200 is configured to be longer than the circumference of the inner peripheral surface of the shaft hole of the housing 500. Note that the circumference of the outer peripheral surface of the seal ring 200 itself is configured to be shorter than the circumference of the inner peripheral surface of the shaft hole of the housing 500, and thus configured to have no interference. Consequently, when the metal spring 300 is not attached and an external force is not applied, the outer peripheral surface of the seal ring 200 does not make contact with the inner peripheral surface of the shaft hole of the housing 500.
<Seal Ring>
With reference to FIGS. 1 to 4, in particular, the seal ring 200 according to the first example of the present disclosure will be described in detail. On the seal ring 200, an abutment portion 210 is provided at one position in a circumferential direction. In addition, a plurality of concave portions 220 for introducing a fluid is formed on the outer peripheral surface of the seal ring 200 at intervals in the circumferential direction. Further, on an inner peripheral surface of the seal ring 200, protrusions 223 and 224 as guide portions which position the metal spring 300 in an axial direction (a direction of a central axis of the shaft 400; the same shall apply hereinafter) are provided. The protrusions 223 and 224 are provided on a side of one of two side surfaces of the seal ring 200 and on a side of another of the two side surfaces thereof, respectively, so as to be provided on both sides of the metal spring 300. A plurality of the protrusions 223 and 224 are provided at intervals in the circumferential direction.

Note that the seal ring 200 according to the present example has the configuration in which the abutment portion 210, a plurality of the concave portions 220, and a plurality of the protrusions 223 and 224 are formed on an annular member having a rectangular cross section. However, this is only a description of the shape, and this does not necessarily mean that an annular member having the rectangular cross section is used as a material and a process to form an abutment portion 210, a plurality of concave portions 220, and a plurality of protrusions 223 and 224 is applied on this material. As a matter of course, it is also possible to form an abutment portion 210, a plurality of concave portions 220, and a plurality of protrusions 223 and 224 by applying a cutting-work after molding an annular member having a rectangular cross section. However, for example, a plurality of concave portions 220 may be formed by applying a cutting-work after a member having an abutment portion 210 and a plurality of protrusions 223 and 224 is molded in advance; hence production method is not particularly limited.

The abutment portion 210 employs so-called a special step cut in which the abutment portion 210 is cut to have a step-like shape when viewed from each of an outer peripheral surface side and both of side wall surface sides. Accordingly, in the seal ring 200, a first engagement convex portion 211a and a first engagement concave portion 212a are provided on an outer peripheral side on one of two sides separated by a cutoff portion, and a second engagement concave portion 212b, with which the first engagement convex portion 211a is engaged, and a second engagement convex portion 211b, with which the first engagement concave portion 212a is engaged, are provided on an outer peripheral side on another of the two sides. Since the special step cut is a well-known technique, the detailed description thereof will be omitted, but it should be noted that the special step cut has a characteristic such that a stable sealing performance can be maintained even when the circumference of the seal ring 200 changes due to thermal expansion/contraction. Note that although the case of the special step cut is described as an example of the abutment portion 210 thus far, the abutment portion 210 is not limited thereto, and it is also possible to adopt a straight cut or a bias cut. Note that, in a case where a material having low elasticity (PTFE or the like) is adopted as a material for the seal ring 200, the seal ring 200 may be made endless without providing an abutment portion 210.

A plurality of the concave portions 220 are formed at intervals in the circumferential direction. Note that, in the present example, a plurality of the concave portions 220 are provided at regular intervals except in the vicinity of the abutment portion 210. In addition, the length of the concave portion 220 in the circumferential direction is configured to be relatively long, and the length of a portion between the two concave portions 220 in the circumferential direction is configured to be shorter than the length of the concave portion 220 in the circumferential direction except in the vicinity of the abutment portion 210. Hereinafter, the portion between the two concave portions 220 is referred to as a rib 221. With the above configuration, the concave portions 220 are formed over the almost entire region in the circumferential direction. That is, the concave portions 220 are formed over the entire region in the circumferential direction except for the portion where the abutment portion 210 is formed and the portions where a plurality of the ribs 221, each having a short length in the circumferential direction, is formed. In addition, both side surfaces of the rib 221 in the present example are configured to be perpendicular to a bottom surface of the concave portion 220.

In addition, the concave portion 220 is formed so as to extend from one end portion (a high pressure side (H) as will be described later) to a position which does not reach another end portion (a low pressure side (L) as will be described later). More specifically, the concave portion 220 is formed so as to extend to the position in the vicinity of the other end portion. Hereinafter, a portion on the other side (the low pressure side (L)) on the outer peripheral surface side of the seal ring 200 where the concave portion 220 is not formed is referred to as a low pressure side convex portion 222. Note that, with regard to the depth of the concave portion 220, the rigidity of the portions provided with the rib 221 and the low pressure side convex portion 222 is higher as the concave portion 220 is shallower. On the other hand, the rib 221 and the low pressure side convex portion 222 become abraded due to sliding; hence the depth of the concave portion 220 becomes shallower over time. Accordingly, when the depth of the concave portion 220 becomes excessively shallow, a fluid may not be introduced. To cope with this, it is preferable to set the initial depth of the concave portion 220 in consideration of both of the rigidity and maintaining the introduction of the fluid even when the temporal wear progresses. For example, in the case where the thickness of the seal ring 200 is 1.7 mm, the depth of the concave portion 220 is preferably set to 0.1 mm or more and 0.3 mm or less, approximately. With regard to the width of the concave portion 220 (the width in the axial direction), the width of the low pressure side convex portion 222 becomes narrower as the width of the concave portion 220 is made wider. Although a torque can be reduced more as the width is set narrower, sealing performance and durability may be degraded if the width is set excessively narrow. To cope with this, it is desirable to reduce the width as much as possible to the extent that the sealing performance and the durability can be maintained in accordance with a use environment or the like. For example, in the case where the overall length of the width of the seal ring 200 (the width in the axial direction) is 1.9 mm, the width of the low pressure side convex portion 222 is preferably set to 0.3 mm or more and 0.7 mm or less, approximately. In addition, the width of the rib 221 in the circumferential direction is preferably set to 0.3 mm or more and 0.7 mm or less, approximately.

<Mechanism During Use of Sealing Device>

With reference to FIGS. 5 to 7, in particular, the mechanism during use of the sealing device 100 according to the present example will be described. Each of FIGS. 5 and 6 shows a no-load condition in which there is no pressure difference (or there is almost no pressure difference) between the left and right areas separated by the sealing device 100, after the engine has stopped. Note that FIG. 5 is a schematic cross-sectional view (a cross-sectional view including the axis of the shaft 400) of a portion provided with the concave portion 220 on the seal ring 200, and FIG. 6 is a schematic cross-sectional view (a cross-sectional view including the axis of the shaft 400) of a portion provided with the rib 221 on the seal ring 200. The seal ring 200 in FIG. 5 corresponds to an AA cross section in FIG. 3, and the seal ring 200 in FIG. 6 corresponds to a BB cross section in FIG. 3. FIG. 7 shows a condition in which the engine is started, and the fluid pressure in the right area is increased and became higher than the fluid pressure in the left area separated by the sealing device 100. Note that FIG. 7 is a schematic cross-sectional view (a cross-sectional view including the axis of the shaft 400) of the portion provided with the concave portion 220 on the seal ring 200. The seal ring 200 in FIG. 7 corresponds to the AA cross section in FIG. 3.

In a state in which the sealing device 100 is attached to the annular groove 410, the metal spring 300 exhibits the function of pressing the seal ring 200 towards the outer peripheral surface side by its own expansive force. Consequently, portions of the outer peripheral surface of the seal ring 200 except for the concave portions 220, namely portions provided with the rib 221 and the low pressure side convex portion 222 maintain contact with the inner peripheral surface of the shaft hole of the housing 500.

In a condition in which the engine is started and the pressure difference is created, as shown in FIG. 7, the seal ring 200 is in a state in which it is in close contact with the side wall surface on the low pressure side (L) of the annular groove 410 by the fluid pressure from the high pressure side (H). Note that it goes without saying that the seal ring 200 maintains a state in which it is in contact with (it slides against) the inner peripheral surface of the shaft hole of the housing 500.

<Advantages of the Sealing Device According to the Present Example>

According to the sealing device 100 of the present example, the seal ring 200 is pressed towards the outer peripheral surface side by the metal spring 300. Accordingly, even in a condition in which the fluid pressure is not applied (the pressure difference is not created), or the fluid pressure is almost not applied (the pressure difference is almost not created), the seal ring 200 is in contact with the inner peripheral surface of the shaft hole of the housing 500. Note that an annular continuous sealing surface is formed by the outer peripheral surface of the rib 221, the outer peripheral surface of the low pressure side convex portion 222, and the outer peripheral surface of the portion in the vicinity of the abutment portion 210 where the concave portion 220 is not formed. Accordingly, as long as the seal ring 200 maintains a state in which it is in close contact with the side wall surface on the low pressure side (L) of the annular groove 410, the sealing function is exhibited. Consequently, it is possible to hold the fluid pressure from immediately after the start of increase of the fluid pressure in the sealing target area. That is, as for an engine having an idling stop function, it is possible to hold the hydraulic pressure from immediately after the start of increase of hydraulic pressure on the sealing target area side when the engine is started by pressing an accelerator pedal from an engine stop condition.

Generally speaking, in a case of a seal ring made of resin, a function of suppressing leakage of a fluid is not exhibited so well. However, in the present example, because the seal ring 200 is pressed towards the outer peripheral surface side by the metal spring 300, the function of suppressing the leakage of the fluid is exhibited to a certain extent. Accordingly, it becomes possible to maintain the state in which the pressure difference is present for a while even after an action of a pump or the like has stopped due to the stop of the engine. Consequently, in the engine having the idling stop function, in a case where a period of the engine stopping state is not too long, it is possible to maintain the state in which the pressure difference is present; hence, when the engine is re-started, it is possible to suitably hold the fluid pressure from immediately after the re-start.

In a condition in which considerable time has elapsed since the stop of the engine, the fluid pressure no longer acts (the pressure difference becomes zero). In this case, the seal ring 200 may move away from the side wall surface of the annular groove 410 (the side wall surface on the low pressure side (L) when the pressure difference is present). Accordingly, the leakage of the fluid may occur. However, as described above, in the case where the period of the engine stop state is not too long, it is possible to maintain the condition in which the pressure difference is present; hence it is possible to maintain the state in which the seal ring 200 is in close contact with the side wall surface on the low pressure side (L) of the annular groove 410. Consequently, even in a low-load condition, the function of suppressing the leakage of the fluid is exhibited.

In addition, a plurality of the concave portions 220 are formed on the outer peripheral surface of the seal ring 200, and the fluid is introduced into a plurality of the concave portions 220 from the high pressure side (H). Accordingly, even when the fluid pressure is increased, the fluid pressure acts towards the inner peripheral surface side in the region provided with the concave portions 220. Note that arrows in FIG. 7 show a state in which the fluid pressure is acting on the seal ring 200. With this, in the sealing device 100 according to the present example, it is possible to suppress the increase of the pressure towards the outer peripheral surface side by the seal ring 200 due to the increase of the fluid pressure, thereby making it possible to suppress the sliding torque.

In addition, since a plurality of the concave portions 220 are formed at intervals in the circumferential direction, the portion (the rib 221) between two concave portions 220 makes contact with the inner peripheral surface of the shaft hole of the housing 500. Further, by providing a plurality of the ribs 221, it is possible to suppress a degradation in the rigidity of the seal ring 200 as compared with a case where the ribs 221 are not provided. Consequently, it is possible to prevent the seal ring 200 from being tilted within the annular groove 410, and stabilize an attachment state of the seal ring 200. Note that, in a case where a configuration is adopted in which a plurality of the ribs 221 is not provided, it is anticipated that the seal ring 200 may be tilted in counter-clockwise direction in FIGS. 5 and 7.

In addition, in the present example, the concave portions 220 are formed over the entire periphery except in the vicinity of the abutment portion 210 and the portions provided with a plurality of the ribs 221 with a short length in the circumferential direction, and are formed so as to extend from the end portion on the high pressure side (H) to the vicinity of the end portion on the low pressure side (L). As described, in the present example, by providing the concave portions 220 over a large area of the outer peripheral surface of the seal ring 200, it is possible to reduce a sliding area between the seal ring 200 and the inner peripheral surface of the shaft hole of the housing 500 as much as possible, thereby significantly reducing the sliding torque. Note that the sliding area between the seal ring 200 and the inner peripheral surface of the shaft hole of the housing 500 is sufficiently smaller than a contact area between the seal ring 200 and the side wall surface on the low pressure side (L) of the annular groove 410. With this configuration, it is possible to prevent the seal ring 200 from sliding relative to the side wall surface on the low pressure side (L) of the annular groove 410. Consequently, in the seal ring 200 according to the present example, because it is the outer peripheral surface side that is sliding, a lubricating film made of a sealing target fluid (an oil film in the present example) is formed more easily as compared with a case where the sealing ring slides against the side wall surface of the annular groove; hence it becomes possible to further reduce the sliding torque.

As described, since it is possible to realize the reduction of sliding torque, it becomes possible to suppress the generation of heat due to sliding; hence it becomes possible to suitably use the sealing device 100 according to the present example even under high-speed and high-pressure environmental conditions.

Further, in the present example, since the metal spring 300 is provided so as to extend along the inner peripheral surface of the seal ring 200 in a state in which a gap is formed between the metal spring 300 and the groove bottom surface of the annular groove 410, the metal spring 300 is hardly influenced by eccentricity of the shaft 400 and the housing 500. In addition, the seal ring 200 and the metal spring 300 do not rotate relative to each other. Consequently, the seal ring 200 and the metal spring 300 do not slide relative to each other; hence the inner peripheral surface side of the seal ring 200 would not be abraded due to sliding.

In addition, the metal spring 300 is positioned in the axial direction by the protrusions 223 and 224. Consequently, the seal ring 200 is stably pressed towards the outer peripheral surface side by the metal spring 300.

(Modification of Seal Ring)

In the above example, the case where a plurality of the protrusions 223 and 224 are formed on the inner peripheral surface of the seal ring 200 is described as an example of the guide portion that positions the metal spring 300 in the axial direction. As described in the above example, by adopting the configuration in which a plurality of the protrusions 223 and 224 are provided at intervals in the circumferential direction and the protrusion 223 and the protrusion 224 are disposed at different positions in the circumferential direction, it becomes possible to easily form the protrusions 223 and 224 by molding that uses a die. That is, each of the protrusions 223 and 224 does not have an undercut in the axial direction.

Figure 8:
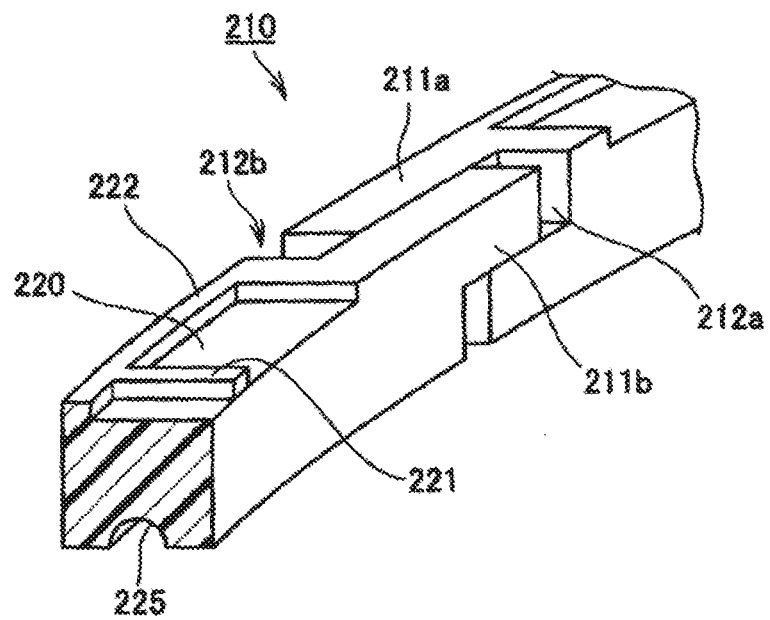
FIG. 8 is a partially cutaway perspective view of an outer peripheral ring according to a modification of the first example of the present disclosure.
Figure 9:
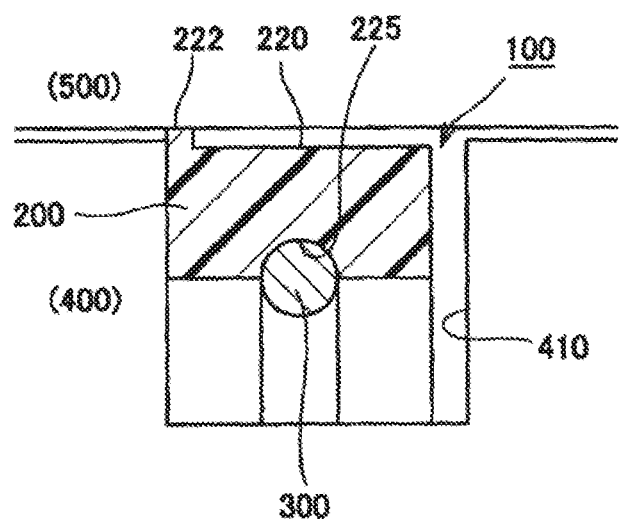
FIG. 9 is a schematic cross-sectional view showing a sealing device according to the modification of the first example of the present disclosure in a no-load condition.

However, the configuration of the guide portion that positions the metal spring 300 in the axial direction is not limited to the configuration described in the above example. For example, as shown in FIGS. 8 and 9, a groove 225 may be formed along the inner peripheral surface of the seal ring 200, and the metal spring 300 may be fitted in the groove 225. In this case, the groove 225 may be formed on the inner peripheral surface of the seal ring 200 by cutting work. In a case where difficulty in cutting arises, a substantially annular groove 225 may be formed excluding the vicinity of the abutment portion. In this case, the metal spring 300, which is a C-ring, may be fitted in the groove 225 such that the cut-out formed at one place in the circumferential direction is positioned in the vicinity of the abutment portion. Note that, in FIGS. 8 and 9, the configuration other than the groove 225 is the same as the configuration described in the above example; hence the same constituent parts are designated by the same reference numerals and the description thereof is omitted.

Figure 10:
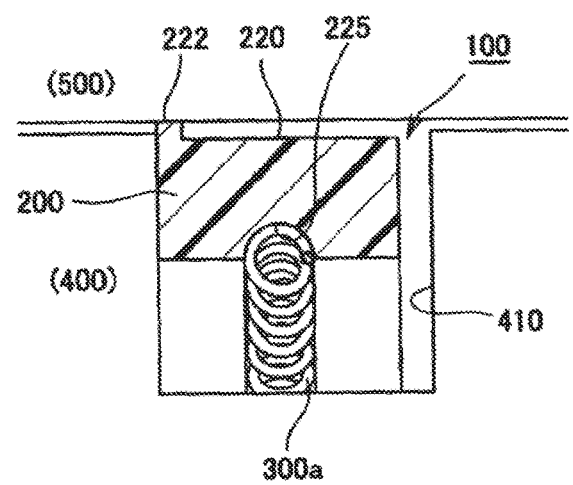
FIG. 10 is a schematic cross-sectional view showing the sealing device according to the modification of the first example of the present disclosure in the no-load condition.
Figure 11:
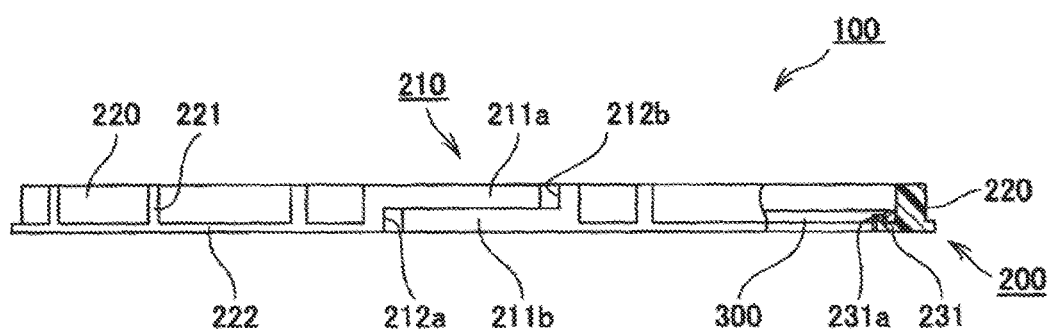
FIG. 11 is a partially cutaway cross-sectional view showing a sealing device according to a second example of the present disclosure.

In addition, the C-ring has been described as an example of the metal spring 300, but the metal spring 300 is not limited to the C-ring. For example, an annular coil spring such as a metal spring 300a shown in FIG. 10 may also be used. Note that, in FIG. 10, the configuration other than the groove 225 and the metal spring 300a is the same as the configuration described in the above example; hence the same constituent parts are designated by the same reference numerals, and the description thereof is omitted.

SECOND EXAMPLE

With reference to FIGS. 11 to 19, a sealing device according to a second example of the present disclosure will be described.

<Configuration of Sealing Device>

Figure 15:
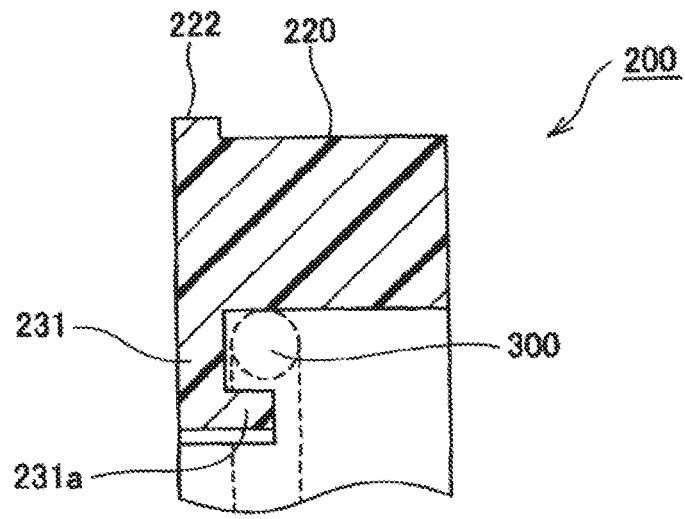
FIG. 15 is a schematic cross-sectional view of the seal ring according to the second example of the present disclosure.
Figure 16:
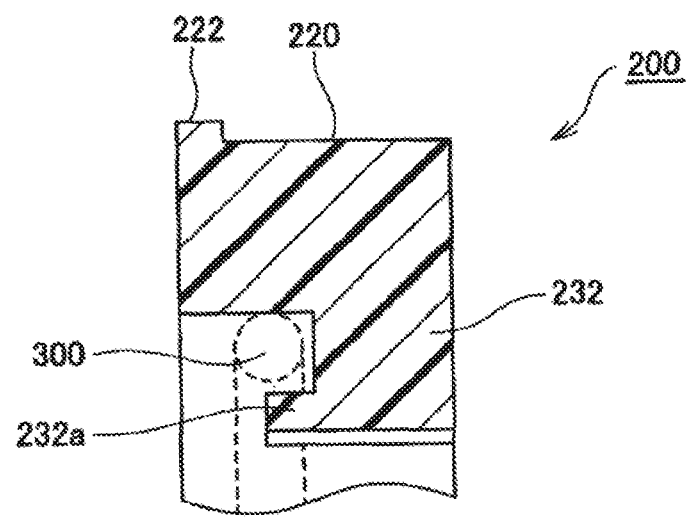
FIG. 16 is a schematic cross-sectional view of the seal ring according to the second example of the present disclosure.
Figure 17:
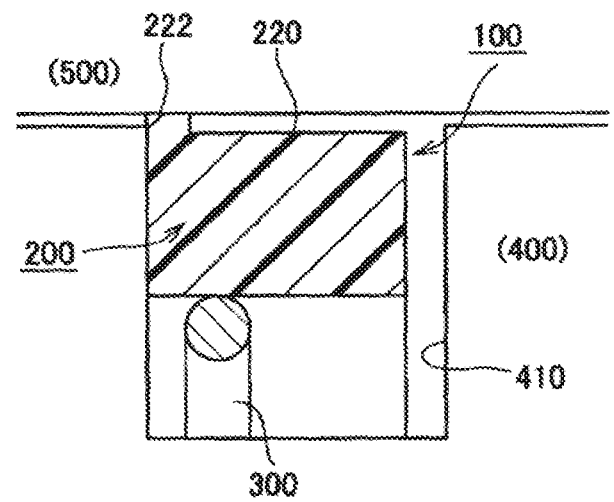
FIG. 17 is a schematic cross-sectional view showing the sealing device according to the second example of the present disclosure in a no-load condition.
Figure 18:
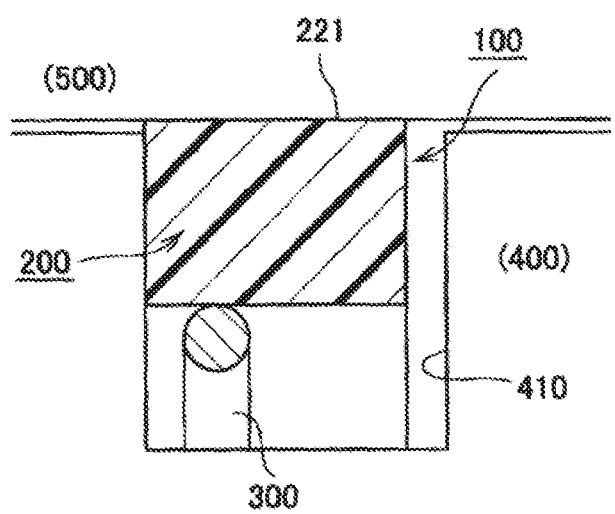
FIG. 18 is a schematic cross-sectional view showing the sealing device according to the second example of the present disclosure in the no-load condition.
Figure 19:
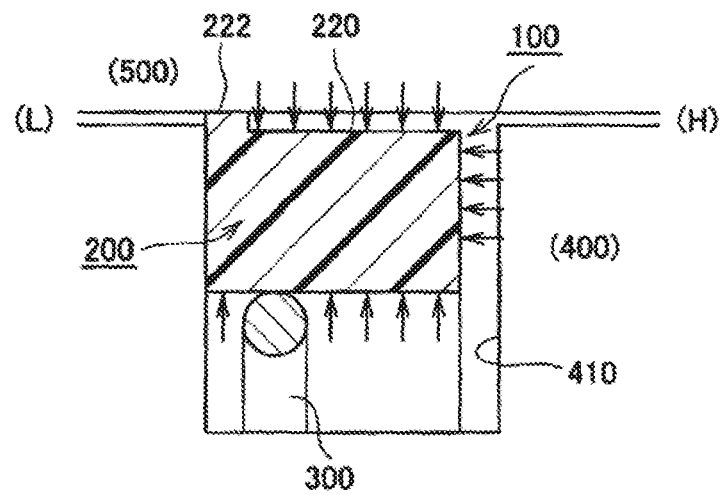
FIG. 19 is a schematic cross-sectional view showing the sealing device according to the second example of the present disclosure in a high-pressure condition.

With reference to FIGS. 11 and 14 to 19, in particular, the configuration of the sealing device according to the second example of the present disclosure will be described. A sealing device 100 according to the present example is attached to an annular groove 410 provided on an outer periphery of a shaft 400, and seals an annular gap between the shaft 400 and a housing 500 (an inner peripheral surface of a shaft hole in the housing 500 through which the shaft 400 is inserted) which rotate relative to each other. With this, the sealing device 100 holds a fluid pressure in a sealing target area configured such that the fluid pressure (a hydraulic pressure in the present example) changes. Herein, in the present example, the fluid pressure in the right area in each of FIGS. 17 to 19 is configured to change, and the sealing device 100 plays a role in holding the fluid pressure in the sealing target area on the right in the drawing. Note that, in a condition in which an engine of an automobile is stopped, the fluid pressure in the sealing target area is low and a no-load condition is created, and when the engine is started, the fluid pressure in the sealing target area increases.

The sealing device 100 according to the present example is constituted of a seal ring 200 that is made of resin such as polyetheretherketone (PEEK), polyphenylene sulfide (PPS), or polytetrafluoroethylene (PTFE), and a metal spring 300. For the metal spring 300 in the present example, a C-ring, in which a cut-out is made at one place on an annular member in a circumferential direction, is used.

In a state in which the seal ring 200 is combined with the metal spring 300, the circumference of an outer peripheral surface of the seal ring 200 is configured to be longer than the circumference of the inner peripheral surface of the shaft hole of the housing 500. Note that the circumference of the outer peripheral surface of the seal ring 200 itself is configured to be shorter than the circumference of the inner peripheral surface of the shaft hole of the housing 500, and thus configured to have no interference. Consequently, when the metal spring 300 is not attached and an external force is not applied, the outer peripheral surface of the seal ring 200 does not make contact with the inner peripheral surface of the shaft hole of the housing 500.

<Seal Ring>

Figure 12:
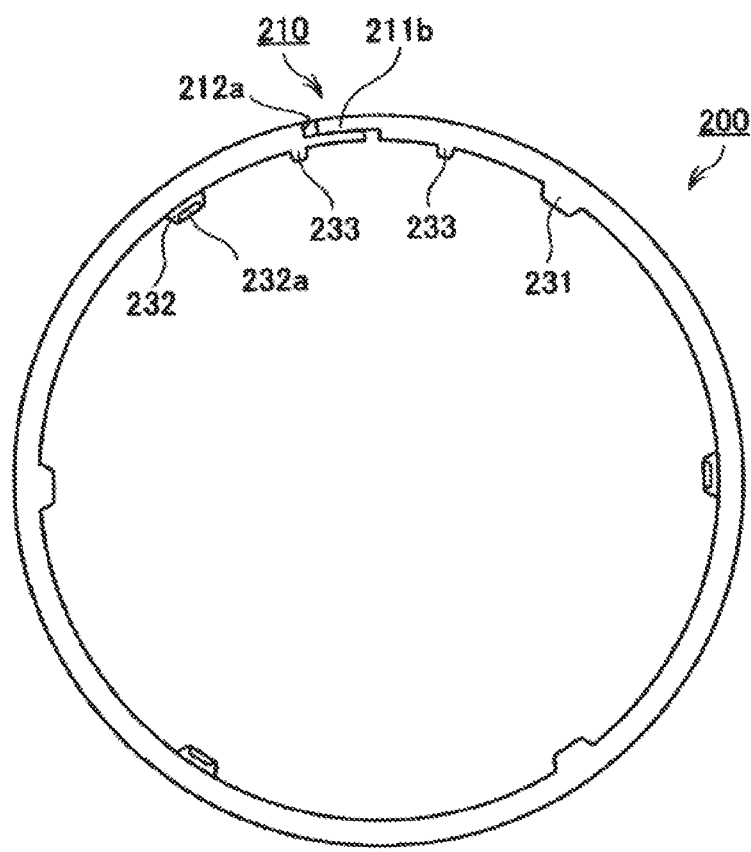
FIG. 12 is a side view of a seal ring according to the second example of the present disclosure.
Figure 13:
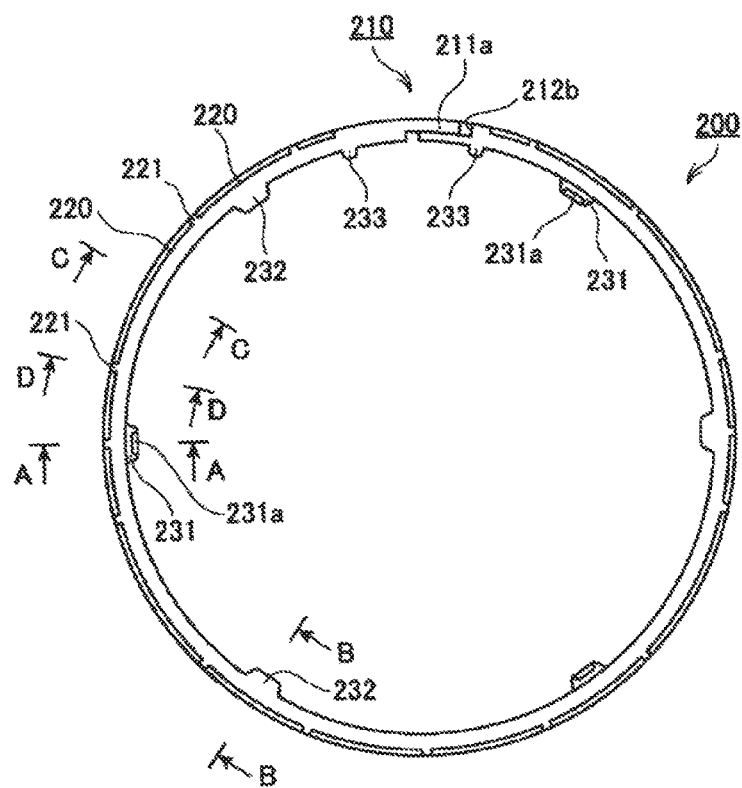
FIG. 13 is a side view of the seal ring according to the second example of the present disclosure.
Figure 14:
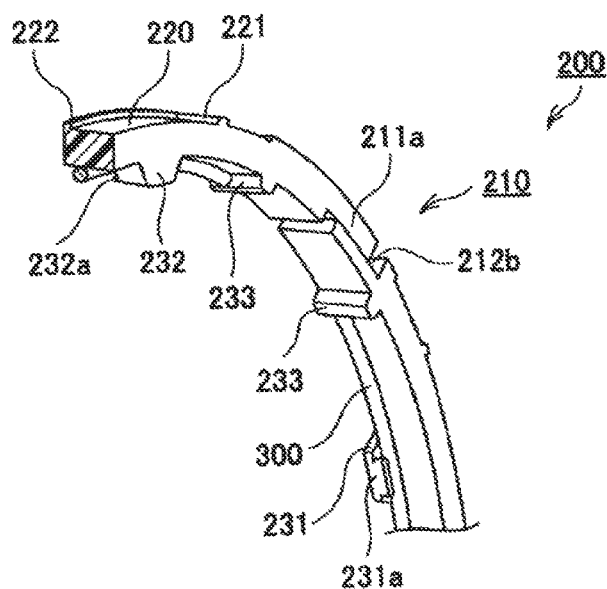
FIG. 14 is a partially cutaway perspective view of the sealing device according to the second example of the present disclosure.

With reference to FIGS. 11 to 16, in particular, the seal ring 200 according to the second example of the present disclosure will be described in detail. Note that FIGS. 12 and 13 are side views of the seal ring 200 according to the present example. FIG. 12 corresponds to a view when the seal ring 200 is seen from the bottom side of the drawing in FIG. 11, and FIG. 13 corresponds to a view when the seal ring 200 is seen from the top side of the drawing in FIG. 11. FIG. 14 is a partially cutaway perspective view of the vicinity of an abutment portion of the sealing device according to the present example. FIGS. 15 and 16 are schematic cross-sectional view of the seal ring 200 according to the present example. FIG. 15 is an AA cross section in FIG. 13, and FIG. 16 is a BB cross section in FIG. 13. Note that, in FIGS. 15 and 16, a position of the metal spring 300 in its attachment state is depicted in dotted-lines.

On the seal ring 200, an abutment portion 210 is provided at one position in a circumferential direction. In addition, a plurality of concave portions 220 for introducing a fluid is formed on the outer peripheral surface of the seal ring 200 at intervals in the circumferential direction.

In addition, on an inner peripheral surface of the seal ring 200, guide protrusions 231 and 232 as guide portions which position the metal spring 300 in an axial direction (a direction of a central axis of the shaft 400) are provided. The guide protrusions 231 and 232 are provided on a side of one of two side surfaces of the seal ring 200 and on a side of another of the two side surfaces thereof, respectively, so as to be provided on both sides of the metal spring 300. A plurality of the guide protrusions 231 and 232 are provided at intervals in the circumferential direction. Note that the guide protrusions 231 and 232 are provided such that they protrude towards the inner peripheral surface side.

In addition, first protrusions 231a and 232a which prevent the metal spring 300 from being detached to the inner peripheral surface side are provided at a tip of the guide protrusion 231 and at a tip of the guide protrusion 232, respectively. The first protrusions 231a and 232a are provided such that they protrude in the axial direction and towards the inner peripheral surface side.

Further, second protrusions 233 which restrict a movement of the metal spring 300 in the circumferential direction are provided on the inner peripheral surface on both sides of the abutment portion 210 of the seal ring 200. Note that the metal spring 300 is attached to the inner peripheral surface side of the seal ring 200 so that two ends separated by the cut-out at one place in the circumferential direction compress a pair of the second protrusions 233 therebetween (see FIG. 14). With this, the ends of the metal spring 300 abut the second protrusions 233, thereby restricting the movement of the metal spring in the circumferential direction.

Note that the seal ring 200 according to the present example has the configuration in which the abutment portion 210, a plurality of the concave portions 220, a plurality of the guide protrusions 231 and 232 provided with the first protrusions 231a and 232a respectively, and the pair of second protrusions 233 are formed on an annular member having a rectangular cross section. However, this is only a description of the shape, and this does not necessarily mean that an annular member having the rectangular cross section is used as a material and a process to form an abutment portion 210, a plurality of concave portions 220, a plurality of the concave portions 220, a plurality of the guide protrusions 231 and 232 provided with the first protrusions 231a and 232a respectively, and the pair of second protrusions 233 is applied on this material. As a matter of course, it is also possible to form an abutment portion 210, a plurality of concave portions 220, a plurality of the concave portions 220, a plurality of the guide protrusions 231 and 232 provided with the first protrusions 231a and 232a respectively, and the pair of second protrusions 233 by applying a cutting-work after molding an annular member having a rectangular cross section. However, for example, a plurality of concave portions 220 may be formed by applying a cutting-work after a member having an abutment portion 210, a plurality of the guide protrusions 231 and 232 provided with the first protrusions 231a and 232a respectively, and the pair of second protrusions 233 is molded in advance; hence production method is not particularly limited.

The abutment portion 210 employs so-called a special step cut in which the abutment portion 210 is cut to have a step-like shape when viewed from each of an outer peripheral surface side and both of side wall surface sides. Accordingly, in the seal ring 200, a first engagement convex portion 211a and a first engagement concave portion 212a are provided on an outer peripheral side on one of two sides separated by a cutoff portion, and a second engagement concave portion 212b, with which the first engagement convex portion 211a is engaged, and a second engagement convex portion 211b, with which the first engagement concave portion 212a is engaged, are provided on an outer peripheral side on another of the two sides. Since the special step cut is a well-known technique, the detailed description thereof will be omitted, but it should be noted that the special step cut has a characteristic such that a stable sealing performance can be maintained even when the circumference of the seal ring 200 changes due to thermal expansion/contraction. Note that although the case of the special step cut is described as an example of the abutment portion 210 thus far, the abutment portion 210 is not limited thereto, and it is also possible to adopt a straight cut or a bias cut.

A plurality of the concave portions 220 are formed at intervals in the circumferential direction. Note that, in the present example, a plurality of the concave portions 220 are provided at regular intervals except in the vicinity of the abutment portion 210. In addition, the length of the concave portion 220 in the circumferential direction is configured to be relatively long, and the length of a portion between the two concave portions 220 in the circumferential direction is configured to be shorter than the length of the concave portion 220 in the circumferential direction except in the vicinity of the abutment portion 210. Hereinafter, the portion between the two concave portions 220 is referred to as a rib 221. With the above configuration, the concave portions 220 are formed over the almost entire region in the circumferential direction. That is, the concave portions 220 are formed over the entire region in the circumferential direction except for the portion where the abutment portion 210 is formed and the portions where a plurality of the ribs 221, each having a short length in the circumferential direction, is formed. In addition, both side surfaces of the rib 221 in the present example are configured to be perpendicular to a bottom surface of the concave portion 220.

In addition, the concave portion 220 is formed so as to extend from one end portion (a high pressure side (H) as will be described later) to a position which does not reach another end portion (a low pressure side (L) as will be described later). More specifically, the concave portion 220 is formed so as to extend to the position in the vicinity of the other end portion. Hereinafter, a portion on the other side (the low pressure side (L)) on the outer peripheral surface side of the seal ring 200 where the concave portion 220 is not formed is referred to as a low pressure side convex portion 222. Note that, with regard to the depth of the concave portion 220, the rigidity of the portions provided with the rib 221 and the low pressure side convex portion 222 is higher as the concave portion 220 is shallower. On the other hand, the rib 221 and the low pressure side convex portion 222 become abraded due to sliding; hence the depth of the concave portion 220 becomes shallower over time. Accordingly, when the depth of the concave portion 220 becomes excessively shallow, a fluid may not be introduced. To cope with this, it is preferable to set the initial depth of the concave portion 220 in consideration of both of the rigidity and maintaining the introduction of the fluid even when the temporal wear progresses. For example, in the case where the thickness of the seal ring 200 is 1.7 mm, the depth of the concave portion 220 is preferably set to 0.1 mm or more and 0.3 mm or less, approximately. With regard to the width of the concave portion 220 (the width in the axial direction), the width of the low pressure side convex portion 222 becomes narrower as the width of the concave portion 220 is made wider. Although a torque can be reduced more as the width is set narrower, sealing performance and durability may be degraded if the width is set excessively narrow. To cope with this, it is desirable to reduce the width as much as possible to the extent that the sealing performance and the durability can be maintained in accordance with a use environment or the like. For example, in the case where the overall length of the width of the seal ring 200 (the width in the axial direction) is 1.9 mm, the width of the low pressure side convex portion 222 is preferably set to 0.3 mm or more and 0.7 mm or less, approximately. In addition, the width of the rib 221 in the circumferential direction is preferably set to 0.3 mm or more and 0.7 mm or less, approximately.

<Mechanism During Use of Sealing Device>

With reference to FIGS. 17 to 19, in particular, the mechanism during use of the sealing device 100 according to the present example will be described. Each of FIGS. 17 and 18 shows a no-load condition in which there is no pressure difference (or there is almost no pressure difference) between the left and right areas separated by the sealing device 100, after the engine has stopped. Note that FIG. 17 is a schematic cross-sectional view (a cross-sectional view including the axis of the shaft 400) of a portion provided with the concave portion 220 on the seal ring 200, and FIG. 18 is a schematic cross-sectional view (a cross-sectional view including the axis of the shaft 400) of a portion provided with the rib 221 on the seal ring 200. The seal ring 200 in FIG. 17 corresponds to a CC cross section in FIG. 13, and the seal ring 200 in FIG. 18 corresponds to a DD cross section in FIG. 13. FIG. 19 shows a condition in which the engine is started, and the fluid pressure in the right area is increased and became higher than the fluid pressure in the left area separated by the sealing device 100. Note that FIG. 19 is a schematic cross-sectional view (a cross-sectional view including the axis of the shaft 400) of the portion provided with the concave portion 220 on the seal ring 200. The seal ring 200 in FIG. 19 corresponds to the CC cross section in FIG. 13.

In a state in which the sealing device 100 is attached to the annular groove 410, the metal spring 300 exhibits the function of pressing the seal ring 200 towards the outer peripheral surface side by its own expansive force. Consequently, portions of the outer peripheral surface of the seal ring 200 except for the concave portions 220, namely portions provided with the rib 221 and the low pressure side convex portion 222 maintain contact with the inner peripheral surface of the shaft hole of the housing 500.

In a condition in which the engine is started and the pressure difference is created, as shown in FIG. 19, the seal ring 200 is in a state in which it is in close contact with the side wall surface on the low pressure side (L) of the annular groove 410 by the fluid pressure from the high pressure side (H). Note that it goes without saying that the seal ring 200 maintains a state in which it is in contact with (it slides against) the inner peripheral surface of the shaft hole of the housing 500.

<Advantages of the Sealing Device According to the Present Example>

According to the sealing device 100 of the present example, the seal ring 200 is pressed towards the outer peripheral surface side by the metal spring 300. Accordingly, even in a condition in which the fluid pressure is not applied (the pressure difference is not created), or the fluid pressure is almost not applied (the pressure difference is almost not created), the seal ring 200 is in contact with the inner peripheral surface of the shaft hole of the housing 500. Note that an annular continuous sealing surface is formed by the outer peripheral surface of the rib 221, the outer peripheral surface of the low pressure side convex portion 222, and the outer peripheral surface of the portion in the vicinity of the abutment portion 210 where the concave portion 220 is not formed. Accordingly, as long as the seal ring 200 maintains a state in which it is in close contact with the side wall surface on the low pressure side (L) of the annular groove 410, the sealing function is exhibited. Consequently, it is possible to hold the fluid pressure from immediately after the start of increase of the fluid pressure in the sealing target area. That is, as for an engine having an idling stop function, it is possible to hold the hydraulic pressure from immediately after the start of increase of hydraulic pressure on the sealing target area side when the engine is started by releasing a brake pedal or pressing an accelerator pedal from an engine stop condition.

Generally speaking, in a case of a seal ring made of resin, a function of suppressing leakage of a fluid is not exhibited so well. However, in the present example, because the seal ring 200 is pressed towards the outer peripheral surface side by the metal spring 300, the function of suppressing the leakage of the fluid is exhibited to a certain extent. Accordingly, it becomes possible to maintain the state in which the pressure difference is present for a while even after an action of a pump or the like has stopped due to the stop of the engine. Consequently, in the engine having the idling stop function, in a case where a period of the engine stopping state is not too long, it is possible to maintain the state in which the pressure difference is present; hence, when the engine is re-started, it is possible to suitably hold the fluid pressure from immediately after the re-start.

In a condition in which considerable time has elapsed since the stop of the engine, the fluid pressure no longer acts (the pressure difference becomes zero). In this case, the seal ring 200 may move away from the side wall surface of the annular groove 410 (the side wall surface on the low pressure side (L) when the pressure difference is present). Accordingly, the leakage of the fluid may occur. However, as described above, in the case where the period of the engine stop state is not too long, it is possible to maintain the condition in which the pressure difference is present; hence it is possible to maintain the state in which the seal ring 200 is in close contact with the side wall surface on the low pressure side (L) of the annular groove 410. Consequently, even in a low-load condition, the function of suppressing the leakage of the fluid is exhibited.

In addition, a plurality of the concave portions 220 are formed on the outer peripheral surface of the seal ring 200, and the fluid is introduced into a plurality of the concave portions 220 from the high pressure side (H). Accordingly, even when the fluid pressure is increased, the fluid pressure acts towards the inner peripheral surface side in the region provided with the concave portions 220. Note that arrows in FIG. 19 show a state in which the fluid pressure is acting on the seal ring 200. With this, in the sealing device 100 according to the present example, it is possible to suppress the increase of the pressure towards the outer peripheral surface side by the seal ring 200 due to the increase of the fluid pressure, thereby making it possible to suppress the sliding torque.

In addition, since a plurality of the concave portions 220 are formed at intervals in the circumferential direction, the portion (the rib 221) between two concave portions 220 makes contact with the inner peripheral surface of the shaft hole of the housing 500. Further, by providing a plurality of the ribs 221, it is possible to suppress a degradation in the rigidity of the seal ring 200 as compared with a case where the ribs 221 are not provided. Consequently, it is possible to prevent the seal ring 200 from being tilted within the annular groove 410, and stabilize an attachment state of the seal ring 200. Note that, in a case where a configuration is adopted in which a plurality of the ribs 221 is not provided, it is anticipated that the seal ring 200 may be tilted in counter-clockwise direction in FIGS. 17 to 19.

In addition, in the present example, the concave portions 220 are formed over the entire periphery except in the vicinity of the abutment portion 210 and the portions provided with a plurality of the ribs 221 with a short length in the circumferential direction, and are formed so as to extend from the end portion on the high pressure side (H) to the vicinity of the end portion on the low pressure side (L). As described, in the present example, by providing the concave portions 220 over a large area of the outer peripheral surface of the seal ring 200, it is possible to reduce a sliding area between the seal ring 200 and the inner peripheral surface of the shaft hole of the housing 500 as much as possible, thereby significantly reducing the sliding torque. Note that the sliding area between the seal ring 200 and the inner peripheral surface of the shaft hole of the housing 500 is sufficiently smaller than a contact area between the seal ring 200 and the side wall surface on the low pressure side (L) of the annular groove 410. With this configuration, it is possible to prevent the seal ring 200 from sliding relative to the side wall surface on the low pressure side (L) of the annular groove 410. Consequently, in the seal ring 200 according to the present example, because it is the outer peripheral surface side that is sliding, a lubricating film made of a sealing target fluid (an oil film in the present example) is formed more easily as compared with a case where the sealing ring slides against the side wall surface of the annular groove; hence it becomes possible to further reduce the sliding torque.

As described, since it is possible to realize the reduction of sliding torque, it becomes possible to suppress the generation of heat due to sliding; hence it becomes possible to suitably use the sealing device 100 according to the present example even under high-speed and high-pressure environmental conditions.

Further, in the present example, since the metal spring 300 is provided so as to extend along the inner peripheral surface of the seal ring 200 in a state in which a gap is formed between the metal spring 300 and the groove bottom surface of the annular groove 410, the metal spring 300 is hardly influenced by eccentricity of the shaft 400 and the housing 500. In addition, the seal ring 200 and the metal spring 300 do not rotate relative to each other. Consequently, the seal ring 200 and the metal spring 300 do not slide relative to each other; hence the inner peripheral surface side of the seal ring 200 would not be abraded due to sliding.

In the present example, the guide protrusions 231 and 232 are provided on the inner peripheral surface of the seal ring 200 as the guide portions that position the metal spring 300 in the axial direction. Consequently, the seal ring 200 is stably pressed towards the outer peripheral surface side by the metal spring 300.

In addition, in the present example, a configuration is adopted in which the first protrusions 231a and 232a which prevent the metal spring 300 from being detached to the inner peripheral surface side are provided at the tips of the guide protrusion 231 and 232. Consequently, it becomes possible to prevent the metal spring 300 from being detached from the seal ring 200 at a time when the seal ring 200 with the metal ring 300 attached thereto is being fitted into the annular groove 410 or in a case where disturbances or the like due to a pressure fluctuation occurred during transportation or usage.

In addition, in the present example, a configuration is adopted in which the second protrusions 233 which restrict a movement of the metal spring 300 in the circumferential direction are provided on the inner peripheral surface on both sides of the abutment portion 210 of the seal ring 200. Consequently, it becomes possible to prevent positional displacement of the metal spring 300 relative to the seal ring 200 in the circumferential direction. Accordingly, it becomes possible to exercise a stable sealing performance.

(Modification of Seal Ring)

In the above example, the case has been described where a plurality of the concave portions 220 are provided at intervals in the circumferential direction on the outer peripheral surface of the seal ring 200 and the rib 221s between the neighboring concave portions 220 are configured to extend in the axial direction. However, the arrangement configuration of the concave portions 220 and the ribs 221 is not limited to such configuration.

Figure 20:
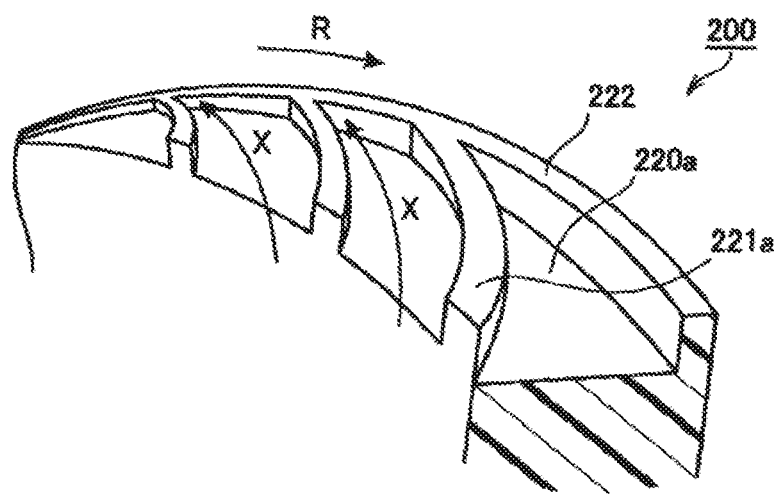
FIG. 20 is a partially cutaway perspective view of a seal ring according to a first modification of the second example of the present disclosure.

For example, as shown by a first modification in FIG. 20, a plurality of ribs 221a may be provided such that they extend form the low pressure side (L) to the high pressure side (H) as they advance in a sliding direction of the seal ring 200 with respect to the housing 500 (a direction of arrow R in FIG. 20). In this case, the fluid introduced into concave portions 220a due to the relative rotation of the housing 500 and the seal ring 200 flows from the high pressure side (H) to the low pressure side (L) and in a sliding direction of the housing 500 with respect to the seal ring 200 aggressively (the fluid flows in a direction of arrow X in FIG. 20).

Accordingly, within the concave portion 220a, the flow of the fluid converges in the vicinity of a wedge-shaped apex formed by the low pressure side convex portion 222 and the rib 221a. As dynamic pressure is created by the convergence of the flow of the fluid, the seal ring 200 is pressed towards the inner peripheral surface side. Consequently, with the help of the dynamic pressure as well, it becomes possible to suppress the increase of the pressure towards the outer peripheral surface side by the seal ring 200, thereby making it possible to suppress the sliding torque. Note that the first modification can be applied to any of the above described first and second examples, and the modification of the first example.

Figure 21:
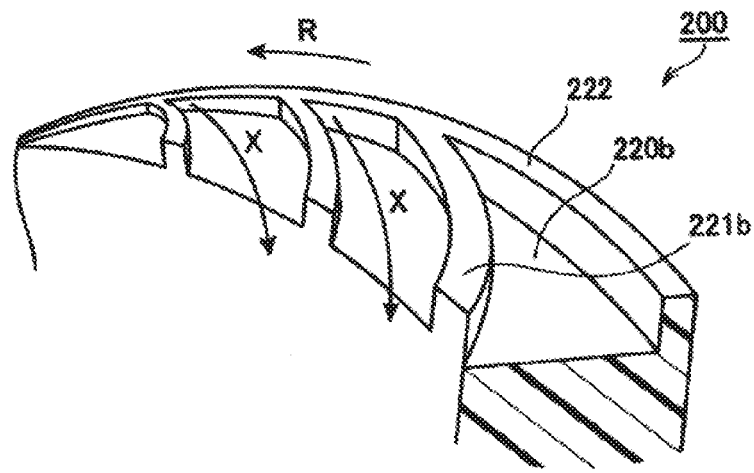
FIG. 21 is a partially cutaway perspective view of a seal ring according to a second modification of the second example of the present disclosure.

In addition, as shown by a second modification in FIG. 21, a plurality of ribs 221b may be provided such that they extend form the high pressure side (H) to the low pressure side (L) as they advance in a sliding direction of the seal ring 200 with respect to the housing 500 (a direction of arrow R in FIG. 21). In this case, the fluid introduced into concave portions 220b due to the relative rotation of the housing 500 and the seal ring 200 flows from the low pressure side (L) to the high pressure side (H) and in a sliding direction of the housing 500 with respect to the seal ring 200 aggressively (the fluid flows in a direction of arrow X in FIG. 21).

As described, the relative rotation of the housing 500 and the seal ring 200 forces the fluid introduced into the concave portions 220b to return to the high pressure side (H). Consequently, a leakage of the fluid can be suppressed. Note that the second modification can be applied to any of the above described first and second examples, and the modification of the first example.

Figure 22:
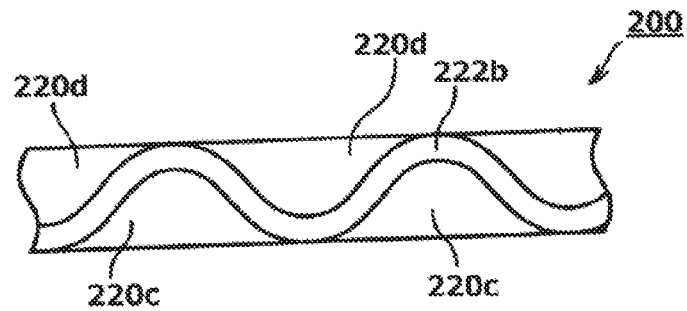
FIG. 22 is a schematic cross-sectional view showing a sealing device according to a third modification of the second example of the present disclosure in a high-pressure condition.

In addition, as shown by a third modification in FIG. 22, a convex portion 222b may be provided on the outer peripheral surface of the seal ring 200 such that the convex portion 222b extends in a circumferential direction, while it also extends to the high pressure side (H) and the low pressure side (L) alternately such that it extends to positions that reach one end face in a width direction and positions that reach another end face in the width direction. More specifically, the convex portion 222b is configured such that it serpentines in the circumferential direction to form a wave shape.

With the provision of the convex portion 222b, a plurality of concave portions 220c and 220d are formed at intervals in the circumferential direction on both of the high pressure side (H) and the low pressure side (L) of the outer peripheral surface of the seal ring 200, respectively. The concave portions 220c on the high pressure side (H) are configured so as to extend from an end portion on the high pressure side (H) to a position which does not reach an end portion on the low pressure side (L), and exhibit a function to introduce the fluid from the high pressure side (H).

The convex portion 222b formed on the outer peripheral surface of the seal ring 200 according to the present modification is formed such that it extends in the circumferential direction while switching the positions on the high pressure side (H) and the low pressure side (L) alternately. Accordingly, a position on the outer peripheral surface of the seal ring 200 that slides against the shaft hole of the housing 500 would not be biased on the high pressure side (H) or the low pressure side (L). Consequently, it becomes possible to prevent the seal ring 200 from being tilted within the annular groove 410, and stabilize the attachment state of the seal ring 200.

In addition, the plurality of concave portions 220c are formed on the outer peripheral surface of the seal ring 200, and the fluid is introduced into the plurality of concave portions 220c from the high pressure side (H). Accordingly, even when the fluid pressure is increased, the fluid pressure acts towards the inner peripheral surface side in the region provided with the concave portions 220c. With this, in the present modification as well, it is possible to suppress the increase of the pressure towards the outer peripheral surface side by the seal ring 200 due to the increase of the fluid pressure, thereby making it possible to suppress the sliding torque.

Furthermore, the seal ring 200 according to the present modification has a structure that is symmetrical with respect to a central plane in the width direction (axial direction). Consequently, it is not necessary to check an attachment direction when attaching the seal ring 200, hence superior in attachability. In addition, it can be applied under a condition in which the high pressure side (H) and the low pressure side (L) alternate. Note that the third modification can be applied to any of the above described first and second examples, and the modification of the first example.

Figure 23:
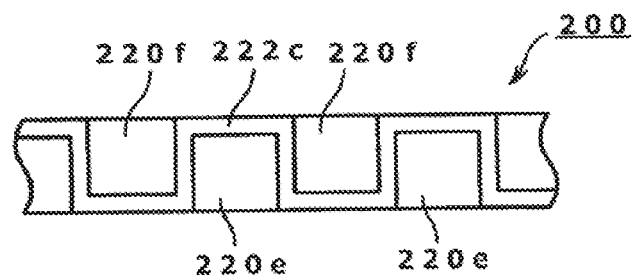
FIG. 23 is a partially cutaway perspective view of a seal ring according to a fourth modification of the second example of the present disclosure.

In addition, as shown by a fourth modification in FIG. 23, a convex portion 222c may be provided on the outer peripheral surface of the seal ring 200 such that the convex portion 222c extends in a circumferential direction, while it also extends to the high pressure side (H) and the low pressure side (L) alternately such that it reaches positions that reach one end face in a width direction and positions that reach another end face in the width direction. However, in the fourth modification, unlike with the above described third modification, the convex portion 222c is configured so as to form a rectangular wave shape in the circumferential direction.

With the provision of the convex portion 222c, a plurality of concave portions 220e and 220f are formed at intervals in the circumferential direction on both of the high pressure side (H) and the low pressure side (L) of the outer peripheral surface of the seal ring 200, respectively. The concave portions 220e on the high pressure side (H) are configured so as to extend from an end portion on the high pressure side (H) to a position which does not reach an end portion on the low pressure side (L), and exhibit a function to introduce the fluid from the high pressure side (H).

It goes without saying that, also in the fourth modification, the same effects as those in the case of the third modification can be achieved. Note that the fourth modification can be applied to any of the above described first and second examples, and the modification of the first example.

Figure 24:
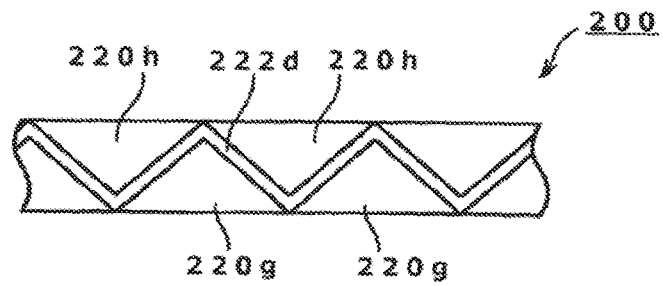
FIG. 24 is a partially cutaway perspective view of a seal ring according to a fifth modification of the second example of the present disclosure.

In addition, as shown by a fifth modification in FIG. 24, a convex portion 222d may be provided on the outer peripheral surface of the seal ring 200 such that the convex portion 222d extends in a circumferential direction, while it also extends to the high pressure side (H) and the low pressure side (L) alternately such that it reaches positions that reach one end face in a width direction and positions that reach another end face in the width direction. However, in the fifth modification, unlike with the above described third modification, the convex portion 222d is configured so as to form a triangular wave shape in the circumferential direction.

With the provision of the convex portion 222d, a plurality of concave portions 220g and 220h are formed at intervals in the circumferential direction on both of the high pressure side (H) and the low pressure side (L) of the outer peripheral surface of the seal ring 200, respectively. The concave portions 220g on the high pressure side (H) are configured so as to extend from an end portion on the high pressure side (H) to a position which does not reach an end portion on the low pressure side (L), and exhibit a function to introduce the fluid from the high pressure side (H).

It goes without saying that, also in the fifth modification, the same effects as those in the case of the third modification can be achieved. Note that the fifth modification can be applied to any of the above described first and second examples, and the modification of the first example.

In addition, as described in the above examples, the reason for providing the plurality of concave portions 220 in the circumferential direction to provide the rib 221 between the two concave portions 220 is to prevent the seal ring from being tilted within the annular groove 410.

Figure 25:
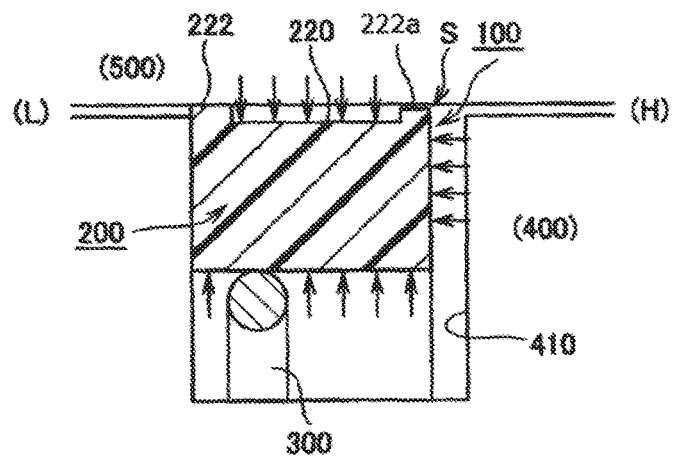
FIG. 25 is a schematic cross-sectional view showing a sealing device according to a sixth modification of the second example of the present disclosure.
Figure 26:
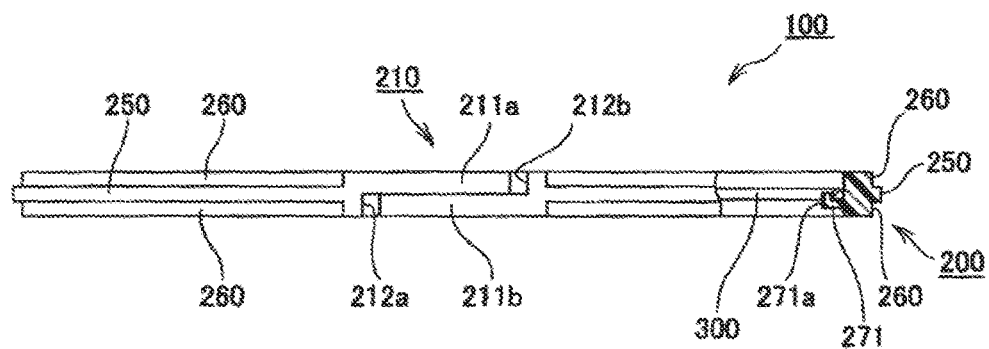
FIG. 26 is a partially cutaway cross-sectional view of a sealing device according to a third example of the present disclosure.

However, as shown by a sixth modification in FIG. 25, the tilting of the seal ring 200 may be prevented by providing, on the outer peripheral surface of the seal ring 200, one concave portion 220 over the entire periphery except in the vicinity of the abutment portion 210, and not only the low pressure side convex portion 222 but also a high pressure side convex portion 222a on the high pressure side. However, as for the high pressure side convex portion 222a, it is necessary to ensure a gap S between the high pressure side convex portion 222a and the inner peripheral surface of the shaft hole of the housing 500 by making the protrusion amount thereof smaller than that of the low pressure side convex portion 222. By securing the gap S in this manner, it becomes possible to introduce the fluid into the concave portion 220. Note that, similar to the low pressure side convex portion 222, the high pressure side convex portion 222a may be provided over the entire periphery except in the vicinity of the abutment portion 210 of the seal ring 200, or a plurality of the convex portions 222a may be provided at intervals in the circumferential direction. Note that the sixth modification can be applied to any of the above described first and second examples, and the modification of the first example.

(Others)

In the above second example, the case is shown in which the guide protrusions 231 and 232 provided with the first protrusions 231a and 232a respectively, and the second protrusions are all provided on the inner peripheral surface of the seal ring 200.

However, following configurations may be adopted depending on the usage environments. That is, one configuration may be adopted in which the guide protrusions 231 and 232 provided with the first protrusions 231a and 232a respectively are formed on the inner periphery of the seal ring 200, whereas the second protrusions 233 are not. In addition, another configuration may be adopted in which the second protrusions 233 are formed on the inner periphery of the seal ring 200, whereas the guide protrusions 231 and 232 are not. Furthermore, yet another configuration may be adopted in which the guide protrusions 231 and 232 without the first protrusions 231a and 232a, and the second protrusions 233 are formed on the inner periphery of the seal ring 200.

THIRD EXAMPLE

In FIGS. 26 to 31, a third example according to the present disclosure is shown. In the present example, basic configuration and operations thereof are the same as those in the second example; hence the same constituent parts are designated by the same reference numerals, and the description thereof is omitted as appropriate.

<Configuration of Sealing Device>

With reference to FIGS. 26 and 18 to 31, in particular, the configuration of the sealing device according to the third example of the present disclosure will be described. A sealing device 100 according to the present example is attached to an annular groove 410 provided on an outer periphery of a shaft 400, and seals an annular gap between the shaft 400 and a housing 500 (an inner peripheral surface of a shaft hole in the housing 500 through which the shaft 400 is inserted) which rotate relative to each other. With this, the sealing device 100 holds a fluid pressure in a sealing target area configured such that the fluid pressure (a hydraulic pressure in the present example) changes. Herein, in the present example, the fluid pressure in the right area in FIG. 31 is configured to change, and the sealing device 100 plays a role in holding the fluid pressure in the sealing target area on the right in the drawing. Note that, in a condition in which an engine of an automobile is stopped, the fluid pressure in the sealing target area is low and a no-load condition is created, and when the engine is started, the fluid pressure in the sealing target area increases.

The sealing device 100 according to the present example is constituted of a seal ring 200 that is made of resin such as polyetheretherketone (PEEK), polyphenylene sulfide (PPS), or polytetrafluoroethylene (PTFE), and a metal spring 300. For the metal spring 300 in the present example, a C-ring, in which a cut-out is made at one place on an annular member in a circumferential direction, is used.

In a state in which the seal ring 200 is combined with the metal spring 300, the circumference of an outer peripheral surface of the seal ring 200 is configured to be longer than the circumference of the inner peripheral surface of the shaft hole of the housing 500. Note that the circumference of the outer peripheral surface of the seal ring 200 itself is configured to be shorter than the circumference of the inner peripheral surface of the shaft hole of the housing 500, and thus configured to have no interference. Consequently, when the metal spring 300 is not attached and an external force is not applied, the outer peripheral surface of the seal ring 200 does not make contact with the inner peripheral surface of the shaft hole of the housing 500.

<Seal Ring>

Figure 27:
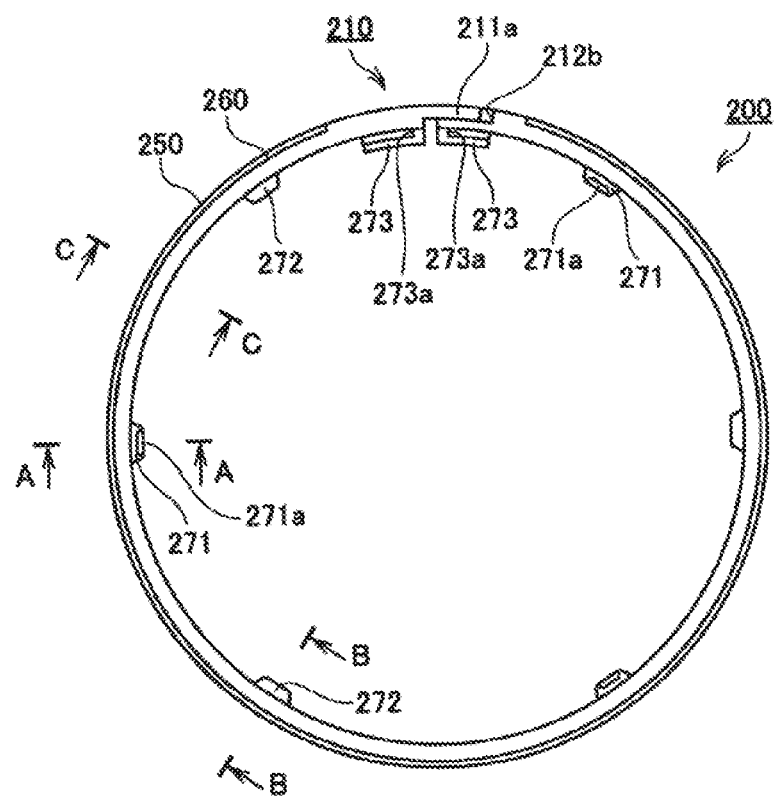
FIG. 27 is a side view of a seal ring according to the third example of the present disclosure.
Figure 28:
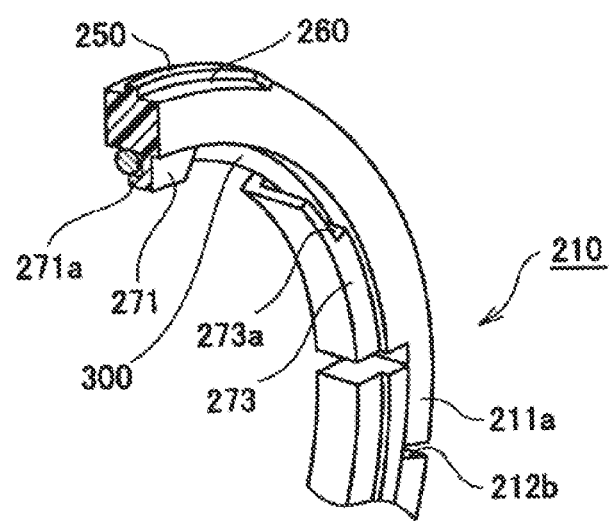
FIG. 28 is a partially cutaway perspective view of the sealing device according to the third example of the present disclosure.
Figure 29:
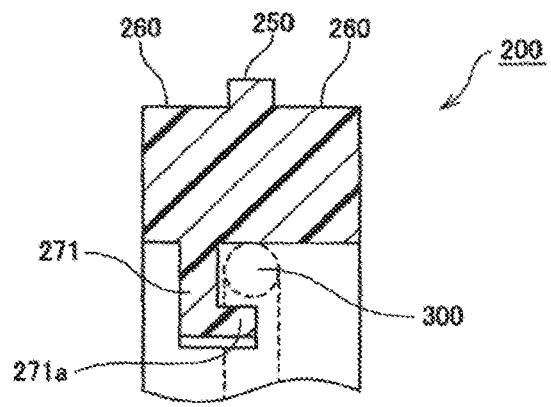
FIG. 29 is a schematic cross-sectional view of the seal ring according to the third example of the present disclosure.
Figure 30:
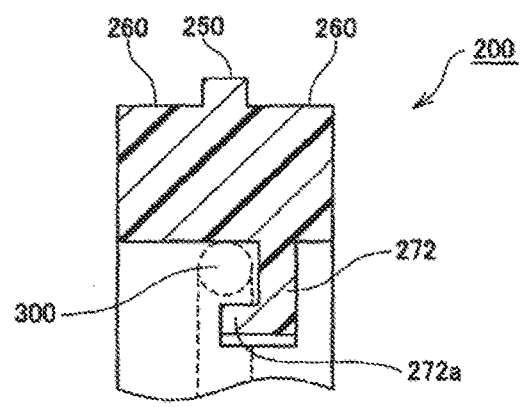
FIG. 30 is a schematic cross-sectional view of the seal ring according to the third example of the present disclosure.
Figure 31:
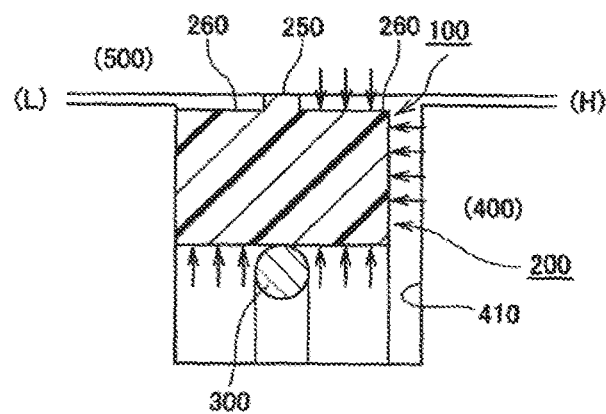
FIG. 31 is a schematic cross-sectional view showing the sealing device according to the third example of the present disclosure in a high-pressure condition.

With reference to FIGS. 26 to 30, in particular, the seal ring 200 according to the third example of the present disclosure will be described in detail. Note that FIG. 28 is a partially cutaway perspective view of the vicinity of an abutment portion of the sealing device according to the present example. FIGS. 29 and 30 are schematic cross-sectional view of the seal ring 200 according to the present example. FIG. 29 is an AA cross section in FIG. 27, and FIG. 30 is a BB cross section in FIG. 27. Note that, in FIGS. 29 and 30, a position of the metal spring 300 in its attachment state is depicted in dotted-lines.

On the seal ring 200, an abutment portion 210 is provided at one position in a circumferential direction. In addition, a convex portion 250 which extends in the circumferential direction is provided at a center in a width direction on the outer peripheral surface of the seal ring 200. A pair of concave portions 260 is provided at both sides of the convex portion 250 in an axial direction (a direction of a central axis of the shaft 400).

In addition, on an inner peripheral surface of the seal ring 200, guide protrusions 271 and 272 as guide portions which position the metal spring 300 in the axial direction are provided. The guide protrusions 271 and 272 are provided on a side of one of two side surfaces of the seal ring 200 and on a side of another of the two side surfaces thereof, respectively, so as to be provided on both sides of the metal spring 300. A plurality of the guide protrusions 271 and 272 are provided at intervals in the circumferential direction. Note that the guide protrusions 271 and 272 are provided such that they protrude towards the inner peripheral surface side.

In addition, first protrusions 271a and 272a which prevent the metal spring 300 from being detached to the inner peripheral surface side are provided at a tip of the guide protrusion 271 and at a tip of the guide protrusion 272, respectively. The first protrusions 231a and 232a are provided such that they protrude in the axial direction and towards the inner peripheral surface side.

Further, second protrusions 273 which restrict a movement of the metal spring 300 in the circumferential direction are provided on the inner peripheral surface on both sides of the abutment portion 210 of the seal ring 200. Herein, the second protrusion 233 in the above described second example is configured so as to extend in the axial direction, whereas the second protrusion 273 in the present example is configured so as to have an engagement concave portion 273a with which an end portion of the metal spring 300 is engaged. However, also in the present example, a configuration that is similar to the second protrusion 233 described in the second example can be adopted.

Note that the seal ring 200 according to the present example has the configuration in which the abutment portion 210, the convex portion 250, the pair of concave portions 260, a plurality of the guide protrusions 271 and 272 provided with the first protrusions 271a and 272a respectively, and the pair of second protrusions 273 are formed on an annular member having a rectangular cross section. However, this is only a description of the shape, and this does not necessarily mean that an annular member having the rectangular cross section is used as a material and a process to form an abutment portion 210, a convex portion 250, a pair of concave portions 260, a plurality of guide protrusions 271 and 272 provided with first protrusions 271a and 272a respectively, and a pair of second protrusions 273 is applied on this material. As a matter of course, it is also possible to form an abutment portion 210, a convex portion 250, a pair of concave portions 260, a plurality of guide protrusions 271 and 272 provided with first protrusions 271a and 272a respectively, and a pair of second protrusions 273 by applying a cutting-work after molding an annular member having a rectangular cross section. However, for example, a convex portion 250 and a pair of concave portions 260 may be formed by applying a cutting-work after a member having an abutment portion 210, a plurality of guide protrusions 271 and 272 provided with first protrusions 271a and 272a respectively, and a pair of second protrusions 273 is molded in advance; hence production method is not particularly limited.

As for the abutment portion 210, similar to the above described first and second examples, so-called a special step cut is employed in the present example as well in which the abutment portion 210 is cut to have a step-like shape when viewed from each of an outer peripheral surface side and both of side wall surface sides. With respect to the abutment portion 210, since the configuration thereof is similar to that in the first or second example, the description thereof is omitted.

The pair of concave portions 260 is formed over the entire periphery except in the vicinity of the abutment portion 210. A portion in the vicinity of the abutment portion 260 where the concave portion 260 is not formed, and an outer peripheral surface of the convex portion 250 are in plane with each other. Accordingly, an annular continuous sealing surface is formed on an outer peripheral surface side of the seal ring 200. That is, on the outer peripheral surface of the seal ring 200 and in a region except for the vicinity of the abutment portion 210, only an outer peripheral surface of the convex portion 250 slides against the inner peripheral surface of the shaft hole.

As for a width of the convex portion 250, although a torque can be reduced more as the width is set narrower, sealing performance and durability may be degraded if the width is set excessively narrow. To cope with this, it is desirable to reduce the width as much as possible to the extent that the sealing performance and the durability can be maintained in accordance with a use environment or the like. For example, in the case where the overall length of the width of the seal ring 200 (the width in the axial direction) is 1.9 mm, the width of the convex portion 250 is preferably set to 0.3 mm or more and 0.7 mm or less, approximately.

<Mechanism During Use of Sealing Device>

With reference to FIG. 31, in particular, the mechanism during use of the sealing device 100 according to the present example will be described. FIG. 31 shows a condition in which the engine is started, and the fluid pressure in the right area is increased and became higher than the fluid pressure in the left area separated by the sealing device 100. Note that the seal ring 200 in FIG. 31 corresponds to the CC cross section in FIG. 27.

In a state in which the sealing device 100 is attached to the annular groove 410, the metal spring 300 exhibits the function of pressing the seal ring 200 towards the outer peripheral surface side by its own expansive force. Consequently, a portion of the outer peripheral surface of the seal ring 200 except for the concave portions 260, namely a portion provided with the convex portion 250 maintains contact with the inner peripheral surface of the shaft hole of the housing 500.

In a condition in which the engine is started and the pressure difference is created, as shown in FIG. 31, the seal ring 200 is in a state in which it is in close contact with the side wall surface on the low pressure side (L) of the annular groove 410 by the fluid pressure from the high pressure side (H). Note that it goes without saying that the seal ring 200 maintains a state in which it is in contact with (it slides against) the inner peripheral surface of the shaft hole of the housing 500.

<Advantages of the Sealing Device according to the Present Example>

Also in the sealing device 100 according to the present example configured as described above, the same effects as those in the case of the second example can be achieved.

Note that in the case of the sealing device 100 according to the present example, among the pair of concave portions 260 provided on the seal ring 200, the fluid is introduced into the concave portion 260 on the high pressure side (H) from the high pressure side (H). Consequently, although a function of suppressing the increase of the pressure towards the outer peripheral surface side by the seal ring 200 due to the increase of the fluid pressure may be inferior compared to the second example, the same effect as that in the case of the second example can be achieved. Note that arrows in FIG. 31 show a state in which the fluid pressure is acting on the seal ring 200.

In addition, in the case of the seal ring 200 according to the present example, since the shape thereof is symmetrical with respect to a central plane in the width direction, it is not necessary to check an attachment direction when attaching the seal ring 200 to the annular groove 410. In addition, even under a condition in which the high pressure side (H) and the low pressure side (L) alternate, the advantageous effects as described above can be exhibited.

FOURTH EXAMPLE

Figure 32:
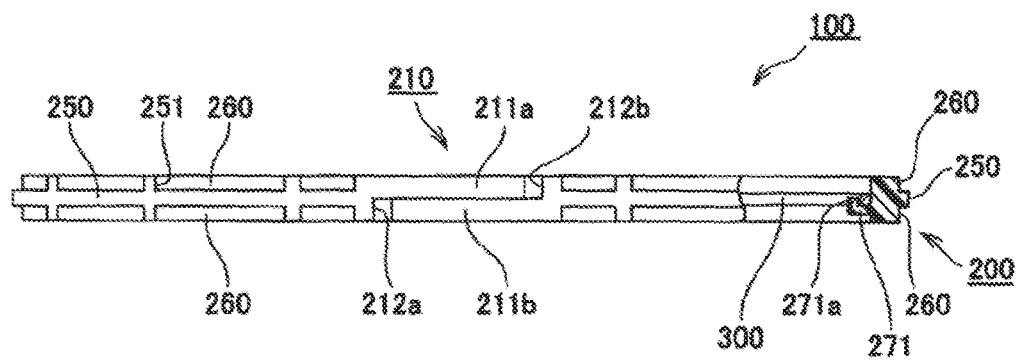
FIG. 32 is a partially cutaway cross-sectional view of a sealing device according to a fourth example of the present disclosure.
Figure 33:
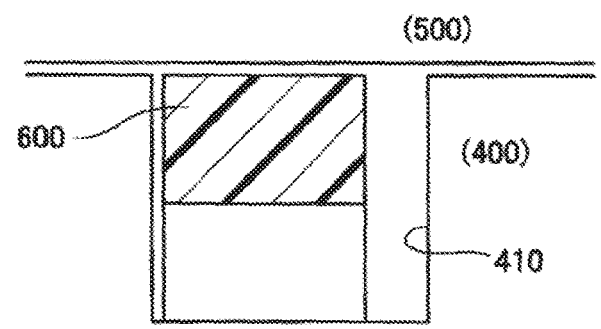
FIG. 33 is a schematic cross-sectional view showing a seal ring according to a conventional art in a condition in which a hydraulic pressure is not held.
Figure 34:
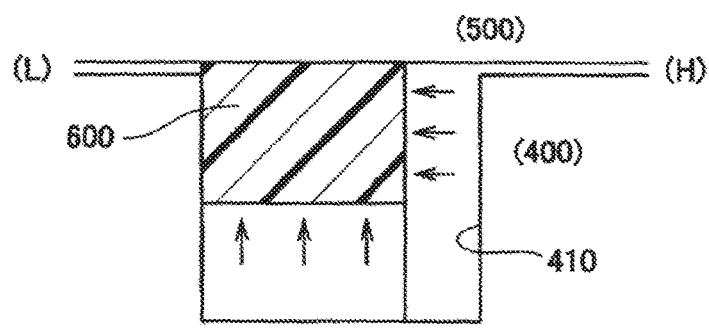
FIG. 34 is a schematic cross-sectional view showing the seal ring according to the conventional art in a condition in which the hydraulic pressure is held.

In FIG. 32, a fourth example according to the present disclosure is shown. In the present example, a configuration is described in which a plurality of ribs is further provided within the pair of concave portions in the configuration of the above described third example. Other configuration and operations thereof are the same as those in the third example; hence the same constituent parts are designated by the same reference numerals, and the description thereof is omitted as appropriate.

The sealing device 100 according to the present example is also constituted of a seal ring 200 that is made of resin and a metal spring 300. The seal ring 200 according to the present example also has an abutment portion 210, a convex portion 250, a pair of concave portions 260, a plurality of guide protrusions 271 and 272 provided with first protrusions 271a and 272a respectively, and a pair of second protrusions 273. Configurations of these are the same as those of the seal ring in the third example; hence the description thereof is omitted. Note that, although the guide protrusion 272 and the second protrusion 273 described in the third example are not depicted in FIG. 32, the seal ring 200 according to the present example is also provided with them. In addition, as for the abutment portion 210, although the case is described where the special step cut is adopted in the present example as well, the abutment portion 210 is not limited thereto as described in the first and second examples.

In the present example, a plurality of ribs 251 that are formed so as to be connected with the convex portion 250 are provided within the pair of concave portions 260. The point that the ribs 251 are further provided is the only difference from the third example.

Also in the sealing device 100 according to the present example configured as described above, the same effects as those in the case of the sealing device 100 according to the third example can be achieved. In addition, in the present example, since the ribs 251 are provided, the rigidity of the sealing ring is high, especially the strength in a torsion direction. Consequently, even under a condition in which the pressure difference becomes large, the deformation of the seal ring 200 is suppressed; hence the sealing performance can be exhibited stably.

REFERENCE SIGNS LIST

100: sealing device
200: seal ring
210: abutment portion
211a: first engagement convex portion
211b: second engagement convex portion
212a: first engagement concave portion
212b: second engagement concave portion
220, 220a, 220b, 220c, 220d, 220e, 220f, 220g, 220h: concave portion
221, 221a, 221b: rib
222: low pressure side convex portion
222a: high pressure side convex portion 222b, 222c, 222d: convex portion
223, 224: protrusion
225: groove
231, 232, 271, 272: guide protrusion
231a, 232a, 271a, 272a: first protrusion
233, 273: second protrusion
250: convex portion
251: rib
260: concave portion
273a: engagement concave portion
400: shaft
410: annular groove
500: housing

What is claimed is:

1. A sealing system comprising:
a housing having a shaft hole disposed therein;
a shaft rotatably disposed in the bore in the housing and including an annular groove in an outer periphery;
a seal ring disposed in the annular groove and sealing an annular gap between the shaft and the housing, the seal ring being made of resin and being in close contact with a side wall surface on a low pressure side of the annular groove, wherein the seal ring slides against an inner peripheral surface of the shaft hole in the housing through which the shaft is inserted; and
a metal spring which is provided along an inner peripheral surface of the seal ring in a state in which a gap is formed between the metal spring and a groove bottom surface of the annular groove, and presses the seal ring toward an outer peripheral surface side, wherein
a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side,
a plurality of circumferentially spaced guide portions which position the metal spring in an axial direction are formed on the inner peripheral surface of the seal ring, the guide portions being provided on a side of one of two side surfaces of the seal ring and on a side of another of the two side surfaces thereof so as to be provided on both sides of the metal spring and the guide portions extending radially inward from the inner peripheral surface of the seal ring, and
a plurality of protrusions which prevent the metal spring from being detached to an inner peripheral surface side is provided at a respective tip of each of the guide portions, the protrusions being provided such that they protrude in the axial direction and the protrusion provided at the guide portion provided on a side of one of the two side surfaces of the seal ring protrudes toward a side of another of the two side surfaces thereof.

2. The sealing device according to claim 1, wherein a convex portion which extends in the circumferential direction is provided at a center in a width direction on the outer peripheral surface of the seal ring, and a portion closer to the high pressure side than the convex portion is the concave portion.

3. A sealing system comprising:
a housing having a shaft hole disposed therein;
a shaft rotatably disposed in the bore in the housing and including an annular groove in an outer periphery;
a seal ring disposed in the annular groove and sealing an annular gap between the shaft and the housing, the seal ring being made of resin and being in close contact with a side wall surface on a low pressure side of the annular groove, wherein the seal ring slides against an inner peripheral surface of the shaft hole in the housing through which the shaft is inserted; and
a metal spring which is provided along an inner peripheral surface of the seal ring in a state in which a gap is formed between the metal spring and a groove bottom surface of the annular groove, and presses the seal ring toward an outer peripheral surface side, wherein
a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side, and
an abutment portion is provided at one position on the seal ring in a circumferential direction, and protrusions which restrict a movement of the metal spring in the circumferential direction are provided on the inner peripheral surface on both sides of the abutment portion, the protrusions extending radially inward from the inner peripheral surface of the seal ring.

4. The sealing device according to claim 3, wherein a convex portion which extends in the circumferential direction is provided at a center in a width direction on the outer peripheral surface of the seal ring, and a portion closer to the high pressure side than the convex portion is the concave portion.

5. A sealing system comprising:
a housing having a shaft hole disposed therein;
a shaft rotatably disposed in the bore in the housing and including an annular groove in an outer periphery;
a seal ring disposed in the annular groove and sealing an annular gap between the shaft and the housing, the seal ring being made of resin and being in close contact with a side wall surface on a low pressure side of the annular groove, wherein the seal ring slides against an inner peripheral surface of the shaft hole in the housing through which the shaft is inserted; and
a metal spring which is provided along an inner peripheral surface of the seal ring in a state in which a gap is formed between the metal spring and a groove bottom surface of the annular groove, and presses the seal ring toward an outer peripheral surface side, wherein
a concave portion is formed on an outer peripheral surface of the seal ring which extends from an end portion on a high pressure side of the outer peripheral surface to a position which does not reach an end portion on a low pressure side of the outer peripheral surface, and introduces a fluid from the high pressure side,
a plurality of circumferentially spaced guide portions which position the metal spring in an axial direction are formed on the inner peripheral surface of the seal ring, the guide portions being provided on a side of one of two side surfaces of the seal ring and on a side of another of the two side surfaces thereof so as to be provided on both sides of the metal spring and the guide portions extending radially inward from the inner peripheral surface of the seal ring, and
a plurality of first protrusions which prevent the metal spring from being detached to an inner peripheral surface side are provided at a respective tip of each of the guide portions, the protrusions being provided such that they protrude in the axial direction and the protrusion provided at the guide portion provided on a side of one of the two side surfaces of the seal ring protrudes toward a side of another of the two side surfaces thereof, and an abutment portion is provided at one position on the seal ring in a circumferential direction, and second protrusions which restrict a movement of the metal spring in the circumferential direction are provided on the inner peripheral surface on both sides of the abutment portion, the second protrusions extending radially inward from the inner surface of the seal ring.

6. The sealing device according to claim 5, wherein a convex portion which extends in the circumferential direction is provided at a center in a width direction on the outer peripheral surface of the seal ring, and a portion closer to the high pressure side than the convex portion is the concave portion.

* * * * *